(12) United States Patent
Eddington et al.

(10) Patent No.: US 12,372,802 B2
(45) Date of Patent: *Jul. 29, 2025

(54) ACTUATOR ASSEMBLY

(71) Applicant: CAMBRIDGE MECHATRONICS LIMITED, Cambridge (GB)

(72) Inventors: Robin Eddington, Cambridge (GB); James Howarth, Cambridge (GB); Valerio Polenta, Cambridge (GB); Andrew Benjamin Simpson Brown, Cambridge (GB); Adam South, Cambridge (GB); Konstantinos Pantelidis, Cambridge (GB); Stephen Matthew Bunting, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/032,271

(22) PCT Filed: Oct. 22, 2021

(86) PCT No.: PCT/GB2021/052756
§ 371 (c)(1),
(2) Date: Apr. 17, 2023

(87) PCT Pub. No.: WO2022/084699
PCT Pub. Date: Apr. 28, 2022

(65) Prior Publication Data
US 2023/0400702 A1    Dec. 14, 2023

(30) Foreign Application Priority Data

Oct. 22, 2020   (GB) ..................... 2016814

(51) Int. Cl.
| | | |
|---|---|---|
| G02B 27/64 | (2006.01) | |
| F03G 7/06 | (2006.01) | |
| G02B 7/02 | (2021.01) | |

(52) U.S. Cl.
CPC ....... *G02B 27/646* (2013.01); *F03G 7/06143* (2021.08); *G02B 7/021* (2013.01); *F05B 2280/5006* (2013.01)

(58) Field of Classification Search
None
See application file for complete search history.

(56) References Cited

U.S. PATENT DOCUMENTS

| 8,830,335 B2 | 9/2014 | Topliss et al. |
| 2007/0280668 A1 | 12/2007 | Kubo et al. |

(Continued)

FOREIGN PATENT DOCUMENTS

| GB | 2500646 A | 10/2013 |
| WO | 2021111131 A1 | 6/2021 |

OTHER PUBLICATIONS

Search and Examination Report of GB Application GB2016814.2 dated Feb. 26, 2021.

(Continued)

*Primary Examiner* — Rodney E Fuller
(74) *Attorney, Agent, or Firm* — Van Hoven PC; Stefan D. Osterbur; Joshua Van Hoven

(57) ABSTRACT

An actuator assembly (2) comprising: first (50) and second (60) parts that are movable relative to each other; and one or more actuating units, each actuating unit comprising: a force-modifying mechanism (72) connected to the first part (50); a coupling link (78) connected between the force-modifying mechanism (72) and the second part (60); and an SMA wire (80) connected between the first part (50) and the force-modifying mechanism (72) for applying an input force (Continued)

on the force-modifying mechanism (72) thereby causing the force-modifying mechanism (72) to apply an output force on the coupling link (78) and causing the coupling link (78) to apply an actuating force on the second part (60); wherein the coupling link (78) is compliant in a direction perpendicular to the direction of the actuating force.

17 Claims, 19 Drawing Sheets

(56) References Cited

U.S. PATENT DOCUMENTS

| | | | | |
|---|---|---|---|---|
| 2011/0249131 | A1* | 10/2011 | Topliss | G03B 5/00 |
| | | | | 348/208.7 |
| 2012/0019675 | A1* | 1/2012 | Brown | H04N 23/687 |
| | | | | 348/E5.045 |
| 2013/0222685 | A1* | 8/2013 | Topliss | G02B 27/646 |
| | | | | 348/373 |
| 2015/0346507 | A1 | 12/2015 | Howarth | |
| 2017/0336646 | A1 | 11/2017 | Miller et al. | |
| 2018/0171991 | A1* | 6/2018 | Miller | F16F 15/06 |
| 2020/0256322 | A1* | 8/2020 | Miller | G02B 6/3584 |
| 2020/0271946 | A1 | 8/2020 | Howarth et al. | |
| 2021/0294069 | A1* | 9/2021 | Miller | G02B 7/09 |
| 2024/0026866 | A1* | 1/2024 | Langhorne | G02B 7/09 |
| 2024/0191704 | A1* | 6/2024 | Brown | G03B 30/00 |

OTHER PUBLICATIONS

International Search Report and Written Opinion of PCT/GB2021/052756 dated Mar. 29, 2022.

* cited by examiner

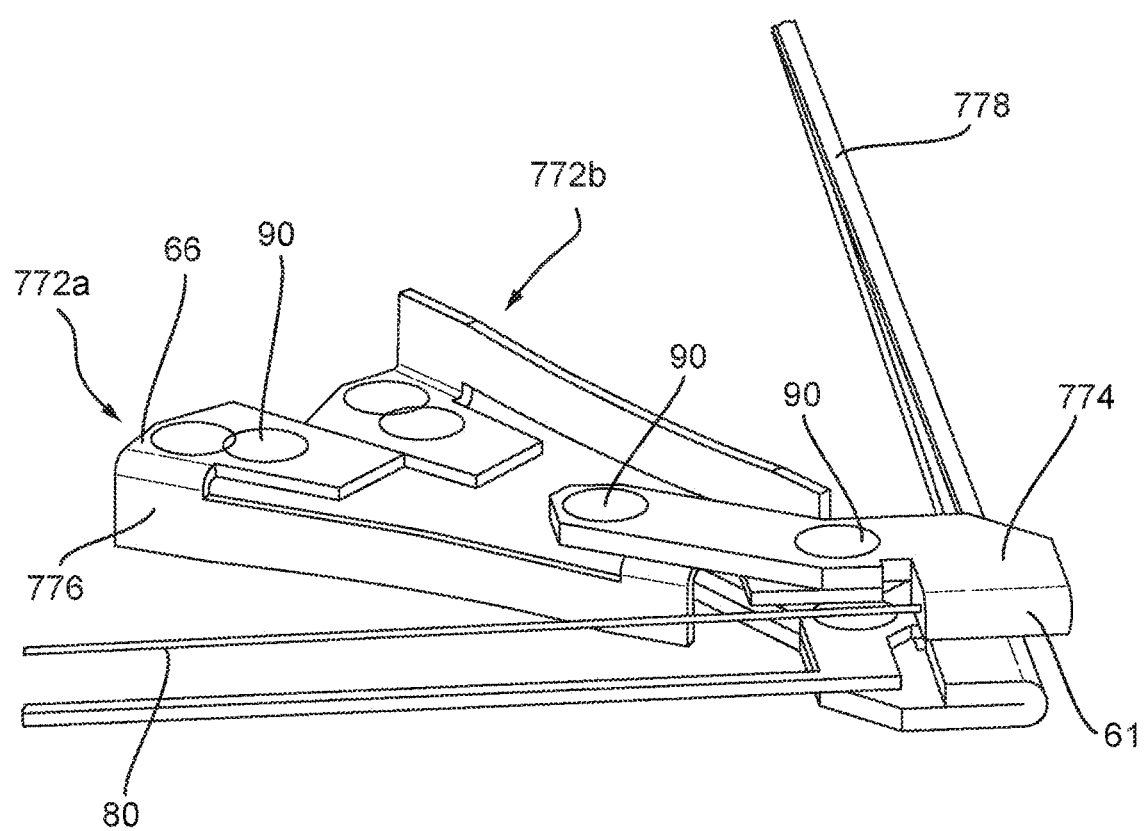

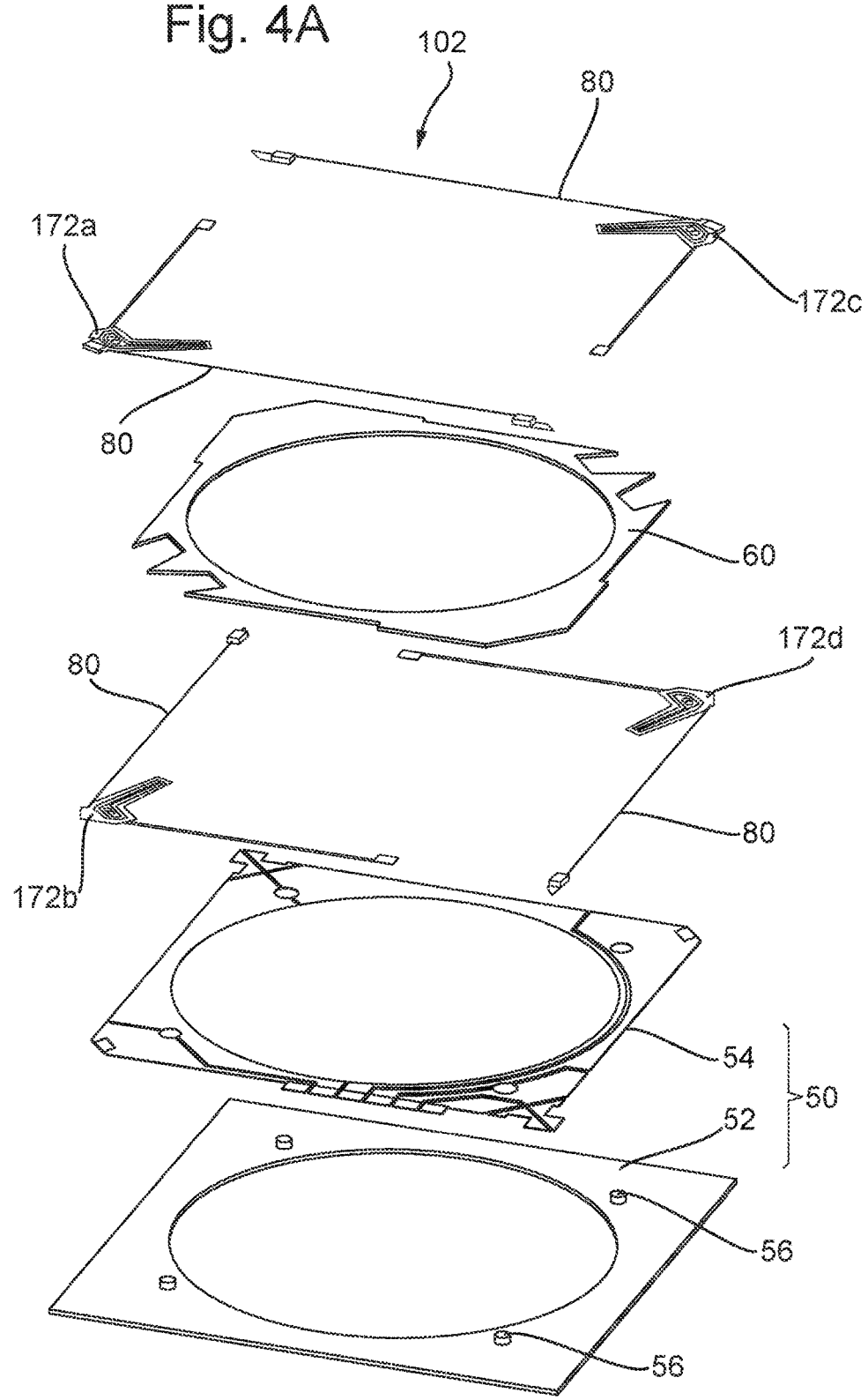

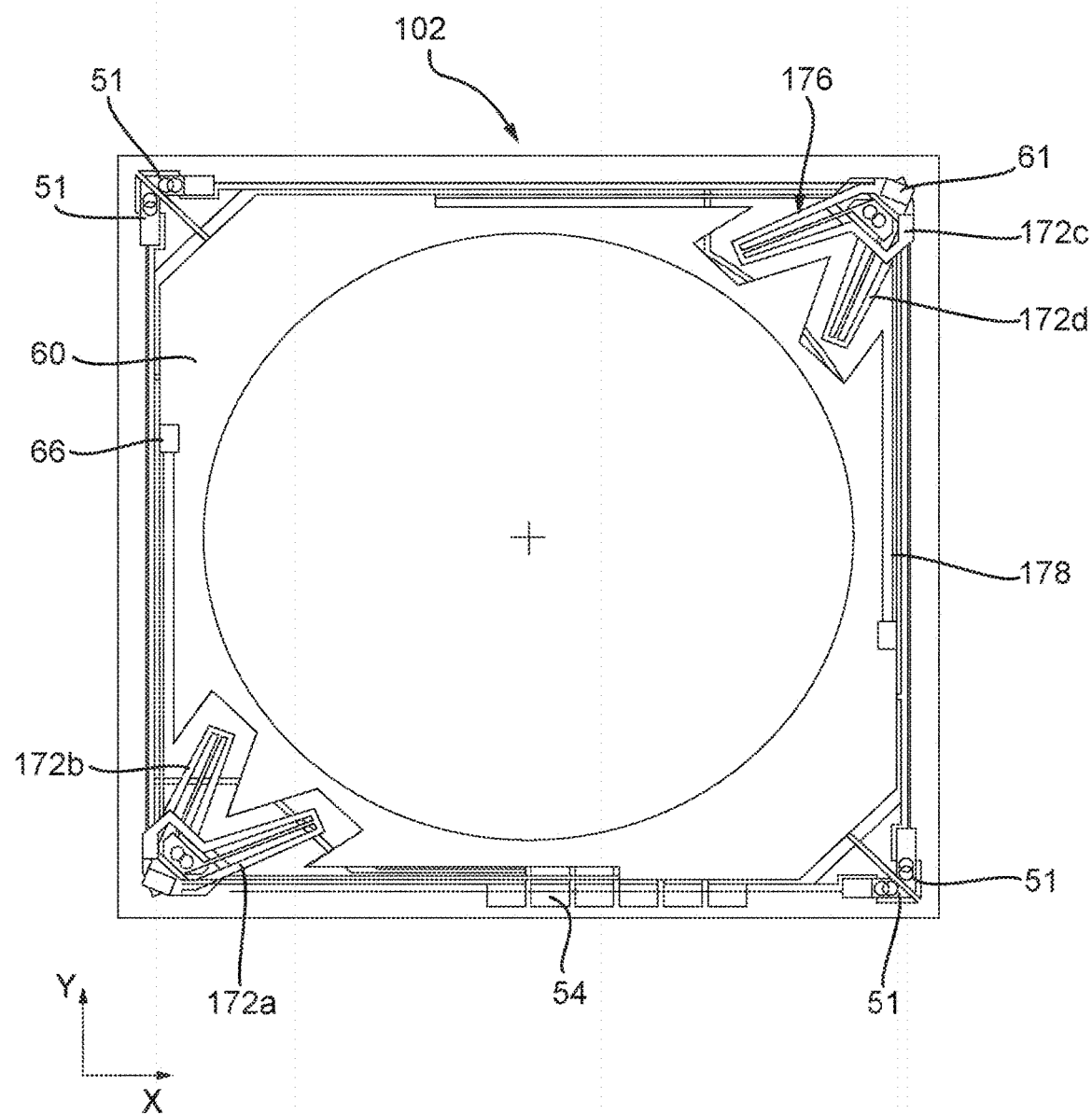

$T1 = Ty@Uy = 0$
$T2 = Tx@Uy = 0$
$Uz = 0$

ACTUATOR ASSEMBLY

CROSS-REFERENCE TO RELATED APPLICATIONS

This application is a national stage application under 35 U.S.C. § 371 of International Application No. PCT/GB2021/052756, filed Oct. 22, 2021, which claims priority of GB Patent Application No. 2016814.2, filed Oct. 22, 2020, the disclosures of each of which are hereby incorporated by reference herein in their entireties.

FIELD

The present application generally relates to an actuator assembly, and in particular to a shape memory alloy (SMA) actuator assembly.

BACKGROUND

Miniature actuators, such as SMA actuators, may be used in camera assemblies for effecting a range of motions of a lens carriage and/or an image sensor.

For example, WO 2013/175197 A1 describes a camera with an SMA actuator assembly including a support structure, a movable part that supports a lens assembly, plural SMA wires connected between the support structure and the movable part, and bearings to bear the movable part on the support structure. This actuator assembly also includes two flexure arms extending between the support structure and the movable part for providing a lateral biasing force that biases the lens assembly towards a central position. The SMA wires are configured to, on contraction, move the movable part in directions perpendicular to an optical axis to provide optical image stabilization (OIS).

Typically, the movement range of a movable part is defined by the extent of contraction in the SMA wires, where the actuating force is also dictated by the input force achievable by the SMA wires. More specifically, the maximum displacement in the movable element in any movement direction may be limited by the relatively small amount of contraction (about 2-3%) in the SMA wires. To increase the maximum stroke, or the actuating force, longer or thicker strands of SMA actuator wire are required.

However, such solutions increase the size of the actuator or reduce the response time. Thus, they may not be practical when used in miniaturised SMA actuator assemblies in mobile devices. In addition, longer or thicker SMA wires may increase the overall cost of an actuator.

Furthermore, flexures may be designed with optimal stiffness, or spring rate, in order to achieve their required functions. Referring to the example of WO 2013/175197 A1, the flexures are designed in a way to ensure the biasing force is sufficient to return the lens carriage to a default position, as well as tensioning the SMA wires. However, the stiffness of such flexures can significantly affect the achievable stroke in an actuator or create undesired tension offsets in different portions of the SMA wire due to the increased opposing force that the SMA wire must overcome. Stiffer flexures provide a stronger returning force but inevitably also increase energy consumption of the actuator.

SUMMARY

The present techniques provide an SMA actuator assembly comprising a force-modifying mechanism that modifies the magnitude of an actuating force with a given input force, which may advantageously amplify the displacement of a movable part with a given amount of contraction in the SMA wires.

Advantageously, such an arrangement may allow a greater stroke (i.e. displacement) to be achieved or it may allow larger forces to be applied so as to move heavier lenses or image sensors, thus improving actuator performance and, for example, OIS capability. Furthermore, the length of the SMA wire for achieving a required stroke may be shortened, thereby reducing the footprint of the SMA actuator assembly, as well as reducing the overall cost and power consumption of the actuator.

According to a first aspect of the present invention, there is provided an actuator assembly comprising: first and second parts that are movable relative to each other; and one or more actuating units, each actuating unit comprising:
  a force-modifying mechanism connected to the first part;
  a coupling link connected between the force-modifying mechanism and the second part; and an SMA wire connected between the first part and the force-modifying mechanism for applying an input force on the force-modifying mechanism thereby causing the force-modifying mechanism to apply an output force on the coupling link and causing the coupling link to apply an actuating force on the second part;
  wherein the coupling link is compliant in a direction perpendicular to the direction of the actuating force.

The actuator assembly may be a micro-actuator for a camera or a mobile phone. The first part may correspond to a support structure and the second part may correspond to a movable part. The actuator assembly may comprise one or more (e.g. elongate) SMA wires, which may connect with the second part by the force-modifying mechanism. That is, such an SMA actuator assembly differs from the prior art actuators in that the SMA wire may not directly connect between the support structure and the movable part. Instead, one end of the SMA wire may be attached to the force-modifying mechanism, whereby the actuating force may be transferred to the movable part through the coupling link. Specially, the coupling link is not an SMA wire.

The SMA wire may be configured to, on contraction, effect relative movement between the first part and the second part in directions in a movement plane substantially orthogonal to an optical axis. The coupling link may be compliant in any direction in the movement plane. Thus, the coupling link can accommodate movement in a direction perpendicular to the actuating force which, for example, may be produced by other actuating units. Such an arrangement may enable at least optical image stabilisation (OIS) to be performed upon actuating the or each of the SMA wires. For example, the SMA wires may each extend in a direction substantially perpendicular to the optical axis. In some embodiments, an SMA wire may be each provided on a respective side of the first part.

The term 'shape memory alloy (SMA) wire' may refer to any element comprising SMA and is also referred to as an SMA component herein. The SMA wire may have any shape that is suitable for the purposes described herein. The SMA wire may be elongate and may have a round cross section or any other shape cross section. The cross section may vary along the length of the SMA wire. It is also possible that the length of the SMA wire (however defined) may be similar to one or more of its other dimensions. The SMA wire may be pliant or, in other words, flexible. In some examples, when connected in a straight line between two elements, the SMA wire can apply only a tensile force which urges the two elements together. In other examples, the SMA wire may be bent around an element and can apply a force to the element as the SMA wire tends to straighten under tension. The SMA wire may be beam-like or rigid and may be able to apply different (e.g. non-tensile) forces to elements.

The SMA wire may or may not include material(s) and/or component(s) that are not SMA. For example, the SMA wire may comprise a core of SMA and a coating of non-SMA material. Unless the context requires otherwise, the term 'SMA wire' may refer to any configuration of SMA wire acting as a single actuating element which, for example, can be individually controlled to produce a force on an element. For example, the SMA wire may comprise two or more portions of SMA wire that are arranged mechanically in parallel and/or in series. In some arrangements, the SMA wire may be part of a larger piece of SMA wire. Such a larger piece of SMA wire might comprise two or more parts that are individually controllable, thereby forming two or more SMA wires.

The SMA wires may be formed of any suitable shape memory alloy material, typically a nickel-titanium alloy (e.g. Nitinol), possibly also containing tertiary components such as copper. The SMA wires may have any cross-sectional profile and diameter suitable for the application. For example, the SMA wires may have a cross section diameter of 25 µm, or 30 µm, or 35 µm, capable of generating a maximum force of between 120 mN to 400 mN whilst maintaining the strain in the SMA wire within safe limits (e.g. 2-3% reduction in length over original length). Increasing the diameter of each SMA wire from 25 µm to 35 µm approximately doubles the cross-sectional area of the SMA wire and thus approximately doubles the force provided by each SMA wire.

The coupling link may form part of the force-modifying mechanism and/or may be formed separately from the other parts of the force-modifying mechanism, e.g. a movable portion. In embodiments, the coupling link may be formed from the same or different material to the other parts of the force-modifying mechanism. For example, the other parts of the force-modifying mechanism may be rigid or at least have a higher stiffness than the coupling link. In embodiments, the coupling link may be attached to the other parts of the force-modifying mechanism by any suitable attaching means, such as welding, adhesive and mechanical means. In some embodiments, the coupling link may be formed integrally with other parts of the force-modifying mechanism. Advantageously, such an arrangement may result in a more efficient manufacturing process, as well as a lower production cost.

In some embodiments, the coupling link may be considered as the component primarily responsible for transferring the actuating force to the second part. The coupling link may be embodied by any element or arrangement capable of fulfilling the dual function of transferring an actuating force to the second part and providing compliance in a direction perpendicular to the direction of the actuating force.

Optionally, the coupling link is or comprises a flexure. The flexure may be elongate and may be stiff along its length and compliant in a direction perpendicular to its length. That is, the coupling link may be referred to as a flexure arm which is configured to bend easily in the movement plane, in particular in the direction orthogonal to the actuating force, but may be stiff or non-compliant in other directions.

Optionally, the coupling link may be configured to apply a lateral biasing force on the second part, so as to return the second part to and/or retain the second part at a default (or central) position. This may be achieved, in particular, in embodiments in which the coupling link comprises a flexure.

Optionally, the coupling link may constrain movement of the second part in a direction perpendicular to the direction of the actuating force. For example, in embodiments in which the first or second part comprises a lens or an image sensor, the coupling link may constrain movement along or parallel to the optical axis. With regard to an image sensor, the optical axis may be considered to be an axis perpendicular to the light-sensitive surface of the image sensor. The coupling link may be a preformed flexure arm that constrains movement along the optical axis.

Alternatively, the coupling link may be a rigid member, such as a rod, with pin joints that allow the coupling link to pivot in the movement plane. For example, the pivot may be a post extending from the force modifying mechanism and hingedly attached to one of the first part and the second part, in particular to the first part. Advantageously, such an arrangement may allow precise control of the displacement in the second part. In some other embodiments, the pivot may be a post extending from the first part or the second part and in contact with the force modifying mechanism, and upon energising the SMA wire (SMA component), the force modifying mechanism may be configured to roll on the surface of the post. In such embodiments, the pivot forms part of a class 1 lever system to increase the displacement of the second part.

Alternatively, the coupling link may comprise a rolling bearing, such as a roller bearing or a ball bearing. The rolling bearing may comprise a rolling element, such as a roller or ball, bearing on respective bearing surfaces of the movable part and of the force-modifying mechanism. The rolling bearing is thus connected between the movable part and the force-modifying mechanism, and arranged to apply an actuating force on the movable part via the rolling element. The rolling bearing achieves compliance in a direction perpendicular to the direction of the actuating force by allowing rolling of the rolling element perpendicular to the actuating force. The bearing surfaces may be arranged to be orthogonal to the actuating force.

Further alternatively, the coupling link may comprise a plain bearing. The plain bearing may also be referred to as a sliding bearing. The plain bearing comprises a bearing surface on the movable part and a complementary bearing surface on the force-modifying mechanism, wherein the two bearing surfaces are slidable relative to each other. The plain bearing is thus connected between the movable part and the force-modifying mechanism by virtue of comprising complementary surfaces on these components and arranged to apply an actuating force on the movable part via the bearing surfaces.

The plain bearing achieves compliance in a direction perpendicular to the direction of the actuating force by allowing relative sliding of the bearing surfaces. The bearing surfaces may be arranged to be orthogonal to the actuating force. The plain bearing may comprise a friction-reducing material, such as a liquid or solid lubricant, between the bearing surfaces.

Optionally, the force-modifying mechanism is configured such that, in response to a change in length of the SMA wire, the end of the SMA wire that is connected to the force-modifying mechanism moves relative to the first part by a first distance, and the end of the coupling link that is connected to the force-modifying mechanism moves relative to the first part by a second distance that is greater than the first distance. Such an arrangement may be used to amplify the stroke achievable by the SMA actuator assembly.

Alternatively, the force-modifying mechanism is configured such that, in response to a change in length of the SMA wire, the end of the SMA wire that is connected to the force-modifying mechanism moves relative to the first part by a first distance, and the end of the coupling link that is connected to the force-modifying mechanism moves relative to the first part by a second distance that is smaller than the first distance. For example, such an arrangement may be configured to increase the applicable actuating force with a given input force by the SMA wire.

Broadly speaking, the present invention uses the force-modifying mechanism as a lever to amplify, or at least modify, the displacement of the movable part achievable by a given amount of SMA wire contraction. This, for example by means of rotation relative to the movable part of the force-modifying mechanism, the present embodiment may reduce the length of SMA wire required to achieve a required stroke. Therefore such an arrangement may provide a more compact, as well as a more energy-efficient, SMA actuator assembly.

In operation, the coupling link may be generally in tension. The force-modifying mechanism may pull on the movable part via the coupling link so as to apply the actuating force to the movable part. This is particularly preferable, for example, when the coupling link comprises a flexure. The end of the coupling link that is connected to the second part may be fixed relative to the second part. The coupling link may extend in substantially the same direction as the output force. The actuating force may be in substantially the same direction as the output force.

Alternatively, the coupling link may be generally in compression. The force-modifying mechanism may push on the movable part via the coupling link so as to apply the actuating force to the movable part. This is particularly preferable, for example, when the coupling link comprises a rolling bearing or plain bearing.

Optionally, the SMA wire extends in a first direction from the force-modifying mechanism to the first part and the coupling link extends in a second direction from the force-modifying mechanism to the second part, the first and second directions being substantially perpendicular to each other. The angle between the first and second directions may be in the range of 75° to 105°. As such, the input and output forces may be substantially perpendicular to each other.

Alternatively, the first and second directions may be in substantially opposite directions. The input and output forces may be in substantially opposite directions. In such embodiments, the force-modifying mechanism may act as a lever, for example, with the SMA wire pulling on the side of the lever on which the movable part is not arranged.

Alternatively, the first and second directions may be in the substantially same direction. The input and output forces may be in the substantially same direction. In such embodiments, the force-modifying mechanism may act as a lever, for example, with the SMA wire pulling on the side of the lever on which the movable part is arranged.

The SMA wire and the coupling link may be substantially coplanar, e.g. in a movement plane of the movable part. The actuating force may be in a direction in the movement plane. The SMA wire may extend along a first side surface of the second part. The coupling link may extend along a second side surface or along the first side surface of the second part. Such an arrangement of SMA wire and coupling link may provide a compact SMA actuator assembly.

Optionally, the force-modifying mechanism comprises a movable portion to which the SMA wire and the coupling link are connected, and a force-modifying flexure connected between the movable portion and the first part and configured to bend or deform in response to the input force. Further optionally, the coupling link comprises a coupling flexure. Such embodiments may be particularly preferable due to improved manufacturability and reduced cost.

The movable portion may be rigid or flexible. The movable portion may be more rigid than the force-modifying flexure in the movement plane such that the movable portion resists deformation as the SMA component contracts. The movable portion may be an extension of the coupling link and/or of the force-modifying flexure.

The force-modifying flexure may be configured to bend such that the second part moves in directions in the aforementioned movement plane.

For example, the force-modifying flexure may connect, at a first connection point, to the first part. By deforming the force-modifying flexure (due to contraction of the SMA wire), the movable portion rotates about and/or translates relative to the first connection point in the movement plane. This rotation and/or translation of the movable portion amplifies the displacement of the second part.

In such embodiments, as the SMA wire contracts, it may draw the movable portion towards the direction of contraction and thereby exert a force on the force-modifying flexure. This may cause the force-modifying flexure to deform (or bend) under compression and the coupling link to deform generally in tension. The force-modifying flexure may be considered as the flexure arm that is primarily responsible for amplification of displacement. The force-modifying flexure may allow the movable portion to rotate about and/or translate relative to the first connection point, thereby changing its orientation. Advantageously, the bending of force-modifying flexure may allow a greater amount of displacement in the second part than the extent of contraction in at least one SMA component along the movement plane.

Broadly speaking, the force-modifying mechanism may connect the movable part and the support structure in two configurations. In a first configuration, the movable portion is connected to the support structure by the SMA wire and the force-modifying mechanism. Upon SMA wire contraction, the coupling link draws on the movable part. In a second (inversed) configuration, the movable portion is connected to the movable part (rather than the support structure) by the SMA wire and the force-modifying flexure. Upon SMA wire contraction, the coupling link draws on the support structure. As such, although for illustrative purposes the first and second parts are referred to as support structure and movable part herein, it will be appreciated that these two parts merely move relative to one another. Although the movable part is described as moving relative to the support structure, such movement is due to defining movement relative to a frame of reference on the support structure. It may well be that, within a larger device in which the SMA actuator assembly is integrated, the support structure moves and the movable part remains stationary, or both the support structure and the movable part move.

Optionally, for example in embodiments in which the force-modifying mechanism and the coupling link comprise flexures, the force-modifying flexure and/or the coupling link are configured to have the same or different stiffness in a direction along the movement plane. For example, the force-modifying flexure may comprise a proximal portion adjacent to the first connection point, and a distal portion further away from the first connection point, wherein the proximal portion of the force-modifying flexure is configured to, along its length, have the same stiffness, or a lower stiffness than, or a higher stiffness than the distal portion in a direction along the movement plane. Such an arrangement may advantageously allow the characteristics of the deformation in the force-modifying flexure and/or the coupling link to be tuned, so as to achieve a desirable rotation/translation in the movable portion.

Optionally, for example in embodiments in which the force-modifying mechanism and the coupling link comprise flexures, the coupling link is, along its length, configured to have a higher stiffness than, or substantially the same stiffness as that of the force-modifying flexure. Higher stiffness in the coupling link may advantageously allow a more precise movement control.

Alternatively, for example in embodiments in which the force-modifying mechanism and the coupling link comprise flexures, the coupling link is, along its length, configured to have a lower stiffness than that of the force-modifying flexure. The coupling link is only responsible to transfer motion in a direction along the movement plane and therefore it may be generally in tension during SMA wire contraction, thus it may be compliant in any other direction. In some embodiments, the coupling flexure may be replaced by a cable or wire.

Optionally, the coupling link extends along a side surface of the second part. For example, the coupling link may draw the movable part in a direction along the coupling link to effect movement.

Optionally, for example in embodiments in which the force-modifying mechanism and the coupling link comprise flexures, at least one of the force-modifying flexure and the coupling link is configured to have a lower stiffness in a direction along the movement plane than any other directions to facilitate the rotation and/or translation of the movable portion. For example, the force-modifying flexure may be formed of thin strips that are flexible only in the movement plane but stiff along the optical axis, e.g. perpendicular to the movement plane. Preferably, both the force-modifying flexure and coupling link are compliant in a direction perpendicular to the actuating force. Advantageously, such an arrangement may ensure the second part only moves in the movement plane, thus providing a more precise movement control and constraining movement along the optical axis.

Optionally, during the rotation and/or translation of the movable portion, the orientation of the movable portion relative to the first connection point changes within a range of any one of less than 20 degrees, less than 10 degrees, or less than 8 degrees. Preferably, the range is less than 5 degrees. Optionally, the orientation of the force-modifying flexure with respect to the SMA wire corresponds or contributes to the degree of amplification in the displacement of the second part. Optionally, the force-modifying flexure extends from the movable portion at an obtuse angle to the SMA wire, but preferably the force-modifying flexure extends from the movable portion at an acute angle to the SMA wire. A smaller angle may allow a higher degree of displacement amplification, but may also reduce the output force for moving the second part. More specifically, the SMA wire may extend in a first direction from the movable portion to the first part and the force-modifying flexure extends in a third direction from the movable portion to the first part, the angle between the first and third directions being less than 45° and/or greater than 20°. This may apply at least at the center of the operating range of movement of the second part relative to the first part.

Advantageously, such an arrangement may ensure the force output of the flexure arrangement is sufficient to effect desirable displacement in the movable part. More preferably, the angle is within the range between 30 to 35 degrees.

Optionally, the force-modifying flexure is located between the SMA wire and the coupling link, the force-modifying flexure comprises a first portion connected to the movable portion that is generally in compression in operation; and a second portion connected between the first portion and the first part that, in operation, is generally in tension and is configured to bend more than the first portion.

That is, although the majority of the force-modifying flexure may be generally in compression during operation, there may be a part of the force-modifying flexure that is generally in tension, wherein the latter may yield to a greater degree during operation.

Alternatively, the force-modifying flexure may be a simple flexure that is generally in compression in operation.

Optionally, the actuating unit comprises a further SMA wire connected between the first part and the coupling link and configured to apply a further force to the coupling link, thereby causing the coupling link to apply a further actuating force to the second part in a direction perpendicular to the actuating force.

The further SMA wire may be connected to an intermediate point of the coupling link. The further SMA wire may extend in a direction that is substantially perpendicular to the direction along which the coupling link extends.

The force-modifying mechanism may comprise a force-modifying flexure connected between the first part and the coupling link. The SMA wire may be connected to (e.g. an intermediate point of) the force-modifying flexure and may extend in a direction that is substantially perpendicular to the direction along which the force-modifying flexure extends.

Optionally, the force-modifying flexure is elongate and is stiff along its length and compliant in a direction perpendicular to its length.

Optionally, the force-modifying flexure and/or the coupling link are formed from sheet material, such as sheet metal, having perpendicularly extending portions.

Optionally, the thickness of the sheet material, e.g. sheet metal, ranges from 40 μm to 80 μm.

Optionally, the SMA wire extends at a first offset distance from the first connection point in plan view and the second flexure arm extends at a second offset distance from the first connection point, wherein the ratio of the second offset distance to the first offset distance corresponds to a degree of amplification in the displacement of the movable part, the ratio of the second offset to the first offset is at least greater than 1, or at least 1.2, or at least 1.5, or at least 2. The force-modifying mechanism (movable portion and force-modifying flexure) may be considered to be a lever system and thus the relative locations of the force input to, and the force output from, the lever system may impact the degree of displacement amplification.

Optionally, the force-modifying mechanism is configured to provide an electrically conductive path between the SMA wire and the first part, in particular a conductive circuitry of the first part. This allows electrical control signals to be applied to the SMA wire without the need for additional electrical connections for the SMA wire.

Optionally, the force-modifying mechanism comprises an electrical break for routing the electrically conductive path. For example, the force-modifying mechanism may comprise at least two conductive paths, wherein the electrical break is formed across one of the conductive paths to allow current to flow in the opposite direction in the two conductive paths. Advantageously, such an arrangement may allow the electromagnetic interference from the two conductive paths to at least partially cancel each other out.

Optionally, the actuator assembly comprising two actuating units arranged to apply actuating forces on the second part in perpendicular directions such that the coupling link of each of the two actuating units is compliant in the direction of the actuating force of the other of the two actuating units.

For example, the force-modifying mechanism of the plural actuating units may be provided on two diagonally opposing corners of the actuator assembly. That is, each of the actuating units may comprise force-modifying flexure configured to provide displacement amplification in a respective direction.

For each of the force-modifying mechanisms, that the coupling link is compliant may be defined by the coupling link producing a relatively small 'opposing' force on the movable part in response to the actuating force of the other one of the two actuating units. For example, the opposing force may be less than 25%, or less than 10%, or less than 5%, or less than 1% of the actuating force over the operating range of movement of the second part relative to the first part.

Alternatively, or in addition, the two force-modifying mechanisms of the actuating units are stacked, or at least partially overlay one on top of each other along an optical axis. They may be provided on the same corners of the actuator assembly and may be placed in a mirrored configuration. That is, each of the actuating units may comprise force-modifying flexure configured to provide displacement amplification in a respective direction.

Optionally, a force-modifying mechanism of a respective actuating unit is provided on each of the corners of the actuator assembly, wherein each actuating unit may be configured to provide displacement amplification in a respective direction perpendicular to the other.

Optionally, each force-modifying mechanism has at least one coupling link connected to a respective side of the second part.

Optionally, each of the force-modifying mechanism is attached to the first by a respective SMA wire, wherein each SMA wire is configured to, on contraction, cause the force-modifying flexure to deform and thereby move the second part in a respective direction along a movement plane. More specifically, each of the force-modifying mechanism is configured to amplify displacement in a respective direction.

Optionally, the actuator assembly comprises a plural force-modifying mechanism, wherein the second part is formed from plural parts each formed integrally with a respective force-modifying mechanism.

Optionally, the actuator assembly comprises four actuating units arranged so as to be capable of moving the second part relative to the first part in any direction in a movement plane without applying any net torque to the second part about a primary axis perpendicular to the movement plane.

Optionally, a first pair of actuating units are each configured to apply a torque to the second part in one sense about the primary axis, and a second pair of actuating units are each configured to apply a torque to the second part in the other sense about the primary axis.

Optionally, the four actuating units are arranged such that their flexures are arranged in a loop at different angular positions around the primary axis and such that the angular position of the coupling link of each actuating unit at least partly overlaps with the angular position of the SMA wire of one other actuating unit.

The SMA wire of each actuating unit may be substantially parallel with the coupling link of the other actuating unit.

Optionally, the one or more actuating units are of a first type and the actuator assembly further comprises:
  one or more actuating units of a second type, each actuating unit of the second type comprising:
    a force-modifying mechanism connected to the second part;
    a coupling link connected between the force-modifying mechanism and the first part; and
    an SMA wire connected between the second part and the force-modifying mechanism for applying an input force on the force-modifying mechanism thereby causing the force-modifying mechanism to apply an output force on the coupling link and the coupling link to apply an actuating force on the first part;
    wherein the coupling link is compliant in a direction perpendicular to the direction of the actuating force.

The actuating units of the second type may have any of the above described features of the actuating units of the first type except that references to the first part should be replaced by references to the second part and vice versa.

In some arrangements, for each pair of actuating units (i.e. the aforementioned first and second pairs), the angular position of the coupling link of each actuating unit in the pair at least partly overlaps with the angular position of the SMA wire of the other actuating unit in the pair. Accordingly, the force-modifying mechanisms of the actuating units in the pair may have a similar angular position. The force-modifying mechanisms of the actuating units in the pair (and/or the actuating units as a whole) may be offset from each other in a direction parallel to the primary axis. The force-modifying mechanisms of the actuating units in different pairs may be angularly spaced from each other by ~180°.

In some arrangements, for each actuating unit, the angular position of the coupling link at least partly overlaps with the SMA wire of one other actuating unit, and the angular position of the SMA wire at least partly overlaps with the coupling link of a different other actuating unit. Accordingly, the force-modifying mechanisms of the actuating units may be at different angular positions and, for example, may be angularly spaced from each other by ~90°.

Two of the four actuating units may be of the first type and two of the four actuating units may be of the second type.

The four actuating units may have a substantially square or oblong footprint when viewed along the primary axis, with an SMA wire along each of the edges and a force-modifying mechanism at each of the corners of the square or oblong.

According to another aspect of the present invention, there is provided a camera assembly comprising the actuator assembly according to the first aspect, wherein the first or second part comprises a lens having an optical axis perpendicular to the movement plane, wherein the actuator assembly provides optical image stabilisation (OIS) for the camera assembly.

According to another aspect of the present invention, there is provided a camera assembly comprising the actuator assembly according to any one of the preceding claims, wherein the first or second part comprises an image sensor having an imaging or optical axis perpendicular to the movement plane, wherein the actuator assembly provides optical image stabilisation (OIS) for the camera assembly.

According to another aspect of the present invention, there is provided an actuator assembly comprising: first and second parts that are movable relative to each other; a flexure arm comprising a fixed end and a movable end, wherein the fixed end is coupled to the first part and the movable end is coupled to the second part; an actuator component arranged, on contraction, to cause the flexure arm to deform and thereby drive movement of movable end so as to move the second part relative to the first part; wherein the actuator component is arranged to exert a compressive force on the flexure arm, the compressive force having a magnitude that causes an effective spring constant of the flexure arm, in a direction along the force applied by the actuator component on the flexure arm, to be reduced by 50% or more compared to a situation in which there is no compressive force exerted on the flexure arm.

The first part may be a support structure, and the second part may be a movable part, or vice versa.

The magnitude of the compressive force may cause the effective spring constant of the flexure arm to be reduced by at least 70%, preferably at least 90%, further preferably at least 95%, most preferably by substantially 100% compared to a situation in which there is no compressive force exerted on the flexure arm.

The first and second parts may be movable relative to each other in a movement plane, and wherein the flexure arm is preferentially compliant in the movement plane and resists deformation in a direction orthogonal to the movement plane.

The flexure arm may be arranged to amplify actuation of the actuator component, such that the displacement of the moveable part is greater than the amount of actuation of the actuator component. Alternatively, the flexure arm may be arranged to amplify an input force applied by the actuator component to the flexure arm, such that an output force applied by the flexure arm to the second part is greater than the input force.

The actuator component may comprise an SMA wire. Alternatively, the actuator component may comprise a voice coil motor or a piezo actuator, for example. The SMA wire may be connected between the first part and the movable end of the flexure arm. One end of the SMA wire may be connected to the first part, and the other end of the SMA wire may be connected to the movable end of the flexure arm.

The SMA wire may comprise a first portion connected between the first part and the movable end of the flexure arm, and a second portion connected between the second part and the movable end of the flexure arm. The angle between the flexure arm and the first portion of the SMA wire and the angle between the flexure arm and the second portion of the SMA wire may be substantially equal.

Alternatively, these angles may differ so as to effect displacement amplification or force amplification, for example in the manner described above. The angle between the first and second portions of the SMA wire may be substantially 90 degrees. Alternatively, the angle between first and second portions may be less than 90 degrees, thereby increasing the compressive force and so the reduction in effective spring constant for a given SMA wire tension.

The SMA actuator assembly may comprise a coupling link between the movable end of the flexure arm and the second part. The coupling link may be any of the coupling links of the embodiments described herein. The coupling link is configured to exert an actuating force on the movable part and be compliant in a direction orthogonal to the actuating force. The angle between the SMA wire and the coupling link may be substantially 90 degrees. Alternatively, the angle between the SMA wire and the coupling link may be less than 90 degrees, thereby increasing the compressive force and so the reduction in effective spring constant for a given SMA wire tension.

The angle between the SMA wire and the flexure arm, in an uncontracted state of the SMA wire, is an acute angle, preferably wherein the angle is less than 45 degrees, further preferably wherein the angle is in the range from 20 degrees to 35 degrees. This may effect displacement or stroke amplification.

Alternatively, the angle between the SMA wire and the flexure arm, in an uncontracted state of the SMA wire, is more than 45 degrees, further preferably wherein the angle is in the range from 60 degrees to 80 degrees. This may effect force amplification.

Upon actuation of the actuator component, the flexure arm may flex up to a degree of any one of less than 20 degrees, less than 10 degrees, less than 8 degrees, and less than 5 degrees. This may make flexing of the flexure arm and movement of the second part more controllable.

BRIEF DESCRIPTION OF THE DRAWINGS

Certain embodiments of the present invention will now be described, by way of example only, with reference to the accompanying drawings, in which:

FIG. 3 is a perspective view showing another embodiment of an actuator unit for use with the SMA actuator assembly illustrated in FIG. 2A;

FIG. 4A is an exploded perspective view of the SMA actuator assembly according to another embodiment of the present invention;

FIG. 4B is a top plan view of the SMA actuator assembly illustrated in FIG. 4A;

DETAILED DESCRIPTION

Camera Assembly

Figure 1:
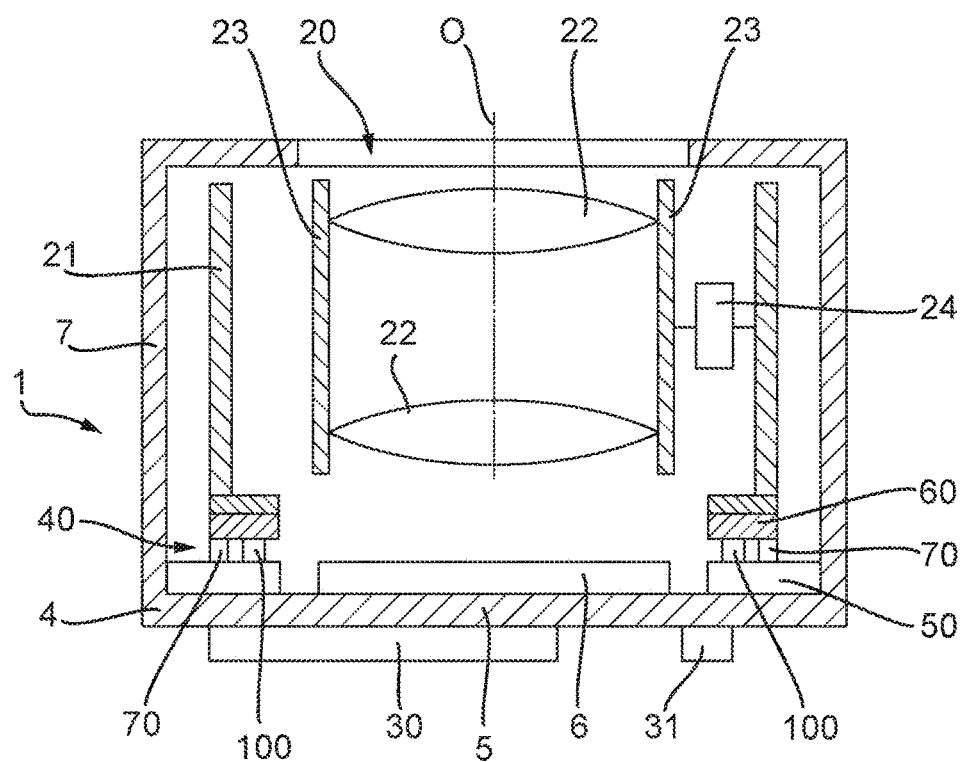
FIG. 1 is a schematic cross-sectional view of a camera incorporating an SMA actuator assembly according to an embodiment of the present invention.

FIG. 1 is a schematic cross-sectional view of a camera incorporating an actuator assembly 2 according to an embodiment of the present invention. In FIG. 1, a camera assembly 1 incorporating an actuator assembly 2 (herein also referred to as an "SMA actuator" or simply an "actuator") is shown.

The camera assembly 1 includes a lens assembly 21 suspended on a support structure 4 (e.g. a first part) by an SMA actuator assembly 2 that supports the lens assembly 21 (an example of a second part or a movable part) in a manner allowing movement of the lens assembly 21 relative to the support structure 4 in directions perpendicular to the optical axis O. In some other embodiments, the lens assembly 21 may be replaced by an image sensor, which is moveable relative to a lens that may be fixed relative to the support structure 4.

The support structure 4 includes a base 5. An image sensor 6 is mounted on a front side of the base 5. On a rear side of the base 5, there is mounted an integrated circuit (IC) 30 in which a control circuit is implemented, and also a gyroscope sensor 31. The support structure 50 also includes a can 7 which protrudes forwardly from the base 5 to encase and protect the other components of the camera 1. In general, the IC 30 and/or gyroscope sensor 31 need not be attached to the base 5, but may be provided elsewhere in a device in which the camera assembly 1 is integrated.

The lens assembly 21 includes a lens carriage 23 in the form of a cylindrical body supporting two lenses 22 arranged along the optical axis O. In general, any number of one or more lenses 22 may be included. Preferably, each lens 22 has a diameter of up to about 20 mm. The camera 1 can therefore be referred to as a miniature camera.

The lens assembly 21 is arranged to focus an image onto the image sensor 6. The image sensor 6 captures the image and may be of any suitable type, for example, a charge-coupled device (CCD) or a complementary metal-oxide semiconductor (CMOS) device.

The lenses 22 may be supported on the lens carriage 23 such that the lenses 22 are movable along the optical axis O relative to the image sensor 6, for example, to provide focusing or zoom. In particular, the lenses 22 are fixed to a lens carriage 23 which is movable along the optical axis O relative to the lens assembly 21. Although all the lenses 22 are fixed to the lens carriage 23 in this example, in general, one or more of the lenses 22 may be fixed to the lens assembly 21 and so not movable along the optical axis O relative to the image sensor 6.

An axial actuator arrangement 24 provided between the lens assembly 21 and the lens carriage 23 is arranged to drive movement of the lens carriage 23 and the lenses 22 along the optical axis O relative to the image sensor 6. The axial actuator arrangement 24 may be of any suitable type, for example, a voice coil motor (VCM) or an arrangement of SMA wires.

Further details are also provided in WO 2013/175197 A1, which is incorporated herein by this reference.

Actuator Assembly

Figure 2A:
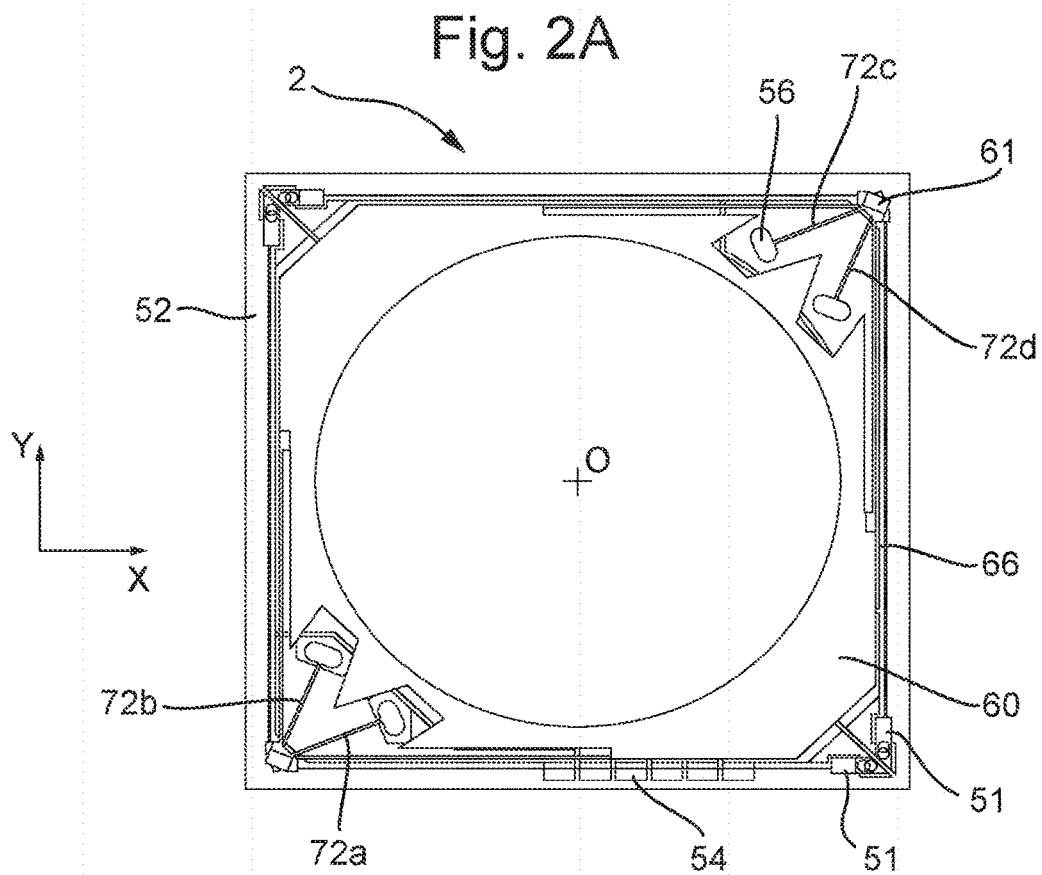
FIG. 2A is a schematic plan view of an SMA actuator assembly, including four actuator units.
Figure 2B:
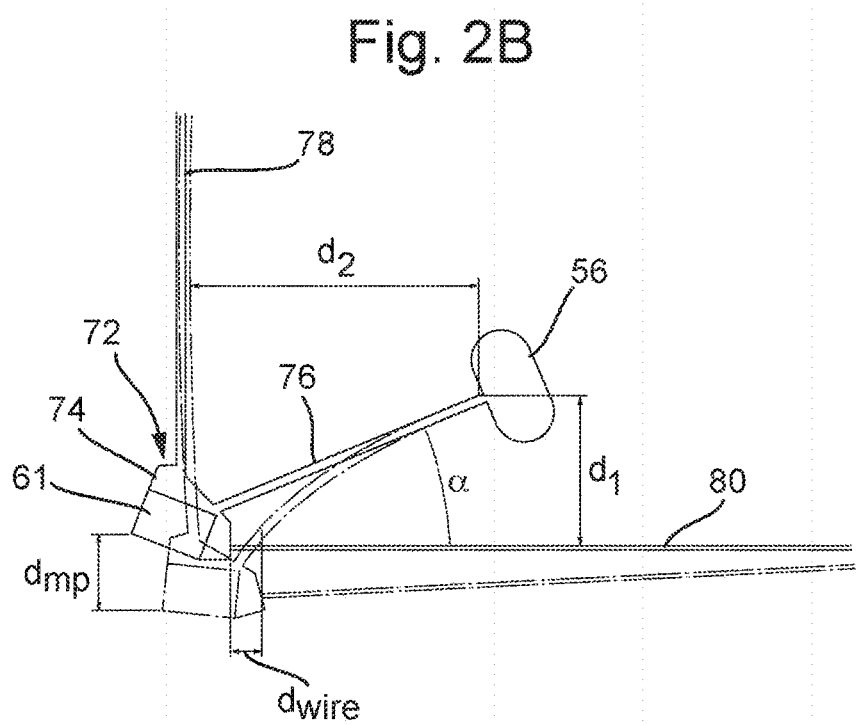
FIG. 2B is an enlarged schematic plan view showing an actuator unit of the SMA actuator assembly illustrated in FIG. 2A.

FIGS. 2A and 2B show an actuator assembly 2 according to an embodiment of the present invention. FIG. 2A is a schematic plan view of the SMA actuator assembly 2 as illustrated in FIG. 1, which actuator assembly 2 includes actuator units in the form of flexure arrangements 72. The actuator assembly 2 of FIG. 2 comprises four actuator units, although in general one or more actuator units may be provided. FIG. 2B shows an enlarged view of a single actuating unit.

The SMA actuator assembly 2 comprises a support structure 50 (an example of the claimed first part) and a movable part 60 (an example of the claimed second part) movable relative to the support structure 50. The support structure 50 of FIG. 2A may correspond to the support structure 4 of FIG. 1. Each of the support structure 50 and the movable part 60 may take the form of a flat, thin annulus with a rectangular outer edge (or "peripheral edge") and a circular inner edge. The outer edge of the movable part 60 lies inside the outer edge of the support structure 50, but the inner edges of the support structure 50 and movable part 60 are generally co-extensive.

The movable part 60 may support the lens assembly 21 (FIG. 1), for example by connecting to the lens carriage 23 (FIG. 1). Alternatively, the movable part 60 may support the image sensor. The support structure 50 is formed from two separate components, namely a support component 52 and a conductive component 54, which are affixed to each other. The support structure 50 may be affixed to the base 5 (FIG. 1) of the camera 1 (FIG. 1).

The SMA actuator assembly 2 may further comprise a suspension system or bearing arrangement for suspending or supporting the movable part 60 on the support structure 50. The bearing arrangement may comprise at least one ball to permit relative orthogonal movement between the movable part 60 and the support structure 50 but prevent movement along the optical axis O. Alternative, in the preferred embodiment, the SMA actuator assembly 2 comprises plural plain bearings spaced around the optical axis O to bear the movable part 60 on the support component 54. The plain bearings may be fixed to the support component 54, for example by adhesive. The plain bearings may be formed integrally with the support component 54, for example by etching the surface of the support component 54. The plain bearing may be formed from a polymer or comprises a polymer coating for reducing friction and/or increasing the longevity of the plain bearings.

In general, any bearing arrangement may be provided to support the movable part 60 on the support structure 50 and allow movement of the movable part 60 relative to the support structure 50. This includes at least plain bearings, rolling bearings such as roller or ball bearings and flexure arrangements. In some embodiments, the movable part 60 may be supported on the support structure by the one or more actuator units, and no dedicated bearing arrangement need be provided.

The bearing arrangement may be biased together, e.g. when in the form of a rolling bearing or plain bearing, by any suitable biasing arrangement. This includes, for example, biasing arrangements comprising dedicated flexures for biasing the bearing arrangement or an arrangement of magnets and optionally ferromagnetic materials. In some embodiments, the one or more actuator units may be configured to bias the movable part towards the support structure, to thereby bias the bearing arrangement together. No dedicated biasing arrangement may be needed.

Each of the movable part 60, the support component 52, and the conductive component 54 may take the form of a patterned sheet of metal, e.g. etched or machined stainless steel. The support component 52 may be coated with an electrically insulating dielectric material. The electrically insulating dielectric material may also be provided on the plain bearings for reducing friction and increasing the longevity of the plain bearings. Other example configurations may be used, and further details are provided in WO 2017/055788 A1 and WO 2019/086855 A1, which are incorporated herein by this reference.

The support structure 50 and the movable part 60 are optionally each provided with a respective central aperture aligned with the optical axis O allowing the passage of light from the lens assembly 21 (FIG. 1) to the image sensor 6 (FIG. 1). Movement of the movable part 60 and, thus, the lens assembly 21 relative to the support structure 50, is driven by a lateral actuation arrangement comprising four SMA wires 80 crimped to the respective crimps 51, 61. In operation, the SMA wires 80 are selectively driven to move the movable part 60 relative to the support structure 50 in any lateral direction (i.e. direction perpendicular to the optical axis O). This is used to provide optical image stabilization (OIS), compensating for movement of the camera 1, which may be caused by handshake, etc.

The support structure 50 and the movable part 60 each have a flat, planar body portion. Each body portion has four major side surfaces. Each body portion also has a central circular hole (i.e. the above-described aperture). The body portions are each perpendicular to the optical axis O (Z-axis), i.e. parallel to the XY-plane. The body portions are each centered on the optical axis (Z-axis) at a central position and have a similar size, shape, and orientation to each other.

The support structure 50 comprises further portions supporting the crimps 51, 61. In this example, the support structure 50 has four crimp supports, each of which supports a crimp 51 (or "static crimp"). The crimp supports for the static crimps 51 are positioned on diagonally opposite corners of the support structure 50. The static crimps are configured to mechanically attach the first ends of SMA wires to the support structure 50.

The SMA actuator assembly may comprise a control circuit for controlling contraction of the SMA wires, for example by supplying suitable voltage or current signals to the SMA wires. Control of the SMA wires may involve feedback control, for example using the measurement of a Hall sensor or a resistance measurement of the SMA wire as a feedback parameter.

Actuator Units

The actuator assembly of FIG. 2A comprises four actuator units. Each actuator unit comprises a force-modifying mechanism connected to one of the support structure 50 and movable part 60. In FIG. 2A, the force-modifying mechanism is embodied by an amplifying flexure 76, although in general any mechanism capable of modifying the force imparted by an SMA wire 80 and/or capable of amplifying or de-amplifying movement created by contraction of an SMA wire 80 may be used in each actuator unit. Each actuator unit further comprises a coupling link, embodied in FIG. 2B by a further flexure 78. In general, the coupling link may be any mechanism capable of transferring an actuating force to the movable part 60 or support structure 50, while allowing compliance in a direction perpendicular to the actuating force.

In FIG. 2A, two pairs of actuating units (in the form of flexure arrangements 72*a-d*) are each provided on diagonally opposing corners of the body portions, and away from the corners with support portions for the static crimps. The actuating units are each stacked along the optical axis O and in a mirrored configuration. FIG. 2B shows an enlarged view of a single actuating unit, in the form of a flexure arrangement 72. The flexure arrangement 72 comprises a flexure body 74 (an example of a movable portion) connected to a first flexure arm 76 or amplifying flexure 76 (an example of a force-modifying mechanism) and a second flexure arm 78 or coupling flexure 78 (an example of a coupling link). In this example, the flexure body 74 is integrally formed with the flexure arms 76, 78. In other embodiments, one or both of the flexure arms 76, 78 may be affixed to the flexure body 74 by welding, adhesive, or any suitable mechanical means.

The flexure arrangements 72*a-d* may provide the following functions: 1) to amplify (or modify) the displacement in the movable part when SMA wires are energised, and optionally 2) to apply a lateral biasing force against the movable part 60, such that the movable part 60 can return to and/or be retained at the central position when the SMA wires 80 are not energised, and/or 3) to apply a biasing force along the optical axis to press the movable part 60 against the bearings.

The amplifying flexure 76 is fixedly attached to the conductive component 54, and hence to the support structure 50, at a first connection point 56. In this embodiment, the first connection point 56 is positioned at, or towards, the corner of the conductive component 54, with the amplifying flexure 76 extending away from the said corner. The end of the amplifying flexure 76 is electrically and mechanically connected to the conductive component 52 of the support structure 50 so as to provide a conductive path for the SMA wire 80 through the moving crimp 61. The moving crimp 61 may be formed integrally with the flexure body, or preferably it may adhere to the flexure body by any suitable means. The position of the first connection point 56, as well as the length and orientation of the amplifying flexure 76, may vary in other embodiments to achieve different levels of displacement amplification in the movable part 60.

The flexure body 74 comprises a crimp support portion for supporting the moving crimp 61. The amplifying flexure 76 projects outwardly from the flexure body 74 at an angle α to the crimped SMA wire 80.

The coupling flexure 78 is fixedly attached to the movable part 60 at a second connection point 66. The second connection point 66 is shown positioned along an edge of the movable part 60 and away from the corner with the first connection point 56. Because of the mirrored arrangement in the flexure arrangement pairs 72*a,b* and 72*c,d*, each major side surface of the movable part 60 has a single coupling flexure 78 attached at a respective connection point 66, wherein the coupling flexures 78 are configured to drive movement of the movable part 60 in different directions that are perpendicular to each other.

When the SMA wire 80 is not energised, i.e. when the SMA actuator 2 is unactuated and the movable part 60 is at the central position, each coupling flexure 78 generally extends in parallel to the corresponding major side surface of the movable part 60. In some other embodiments, the second connection point 66 may be positioned away from the edge and towards the aperture of the movable part 60, and/or the length and orientation of the coupling flexure 78 may vary to allow for different levels of displacement amplification in the movable part 60.

In the exemplified embodiment, the amplifying and coupling flexures 76, 78 (i.e. the amplifying and coupling flexures) are formed integrally with the flexure body 74. That is, the components of the flexure arrangements 72 are made from the same material. The amplifying and coupling flexures 76, 78 are configured to be much thinner in width in the X-Y plane when compared to the rigid frame of the flexure body 74. Thus, the two flexure arms 76, 78 are flexible, or at least less stiff than the flexure body 74. As a result, when the SMA wire 80 contracts, it draws on the flexure body 74 and may cause the amplifying and coupling flexures 76, 78 to deform (or bend) in a direction in the X-Y plane, without also deforming the flexure body 74.

In some other embodiments, one or both of the amplifying and coupling flexures 76, 78 may be formed separately to the flexure body 74. The one or both of the amplifying and coupling flexures 76, 78 may preferably attach onto the flexure body 74 by adhesive, however, such connection may be formed by any other techniques such as welding and mechanical means.

FIG. 2B shows the range of movement of an actuating unit in the form of flexure arrangement 72 upon actuation of an SMA wire 80. On heating of the SMA wire 80, the strain in the SMA wire 80 increases and causes it to contract, thus drawing the flexure body 74 towards the direction of wire contraction. The flexure body 74 is sufficiently stiff to resist deforming in order to efficiently transfer the force to the amplifying flexure 76. The flexure body 74 may thus be considered to be a compression load-bearing member. A range of movement of the movable part 60 may be defined by the range of contraction and/or elongation of the SMA wire 80, and thereby by a range of temperatures in which there occurs a transition of the SMA material from the Martensite phase to the Austenite phase causing contraction.

As the SMA wire 80 contracts, the amplifying flexure 76 may be compressed, thereby deforming (or bending). When deformed, the end of the amplifying flexure 76 that is connected to the flexure body 74 may, when described in a generalised manner, rotate around the first connection point 56. This causes the flexure body 74 to rotate around, as well as translate laterally to, the first connection point 56. The movement of the flexure body 74 consequently draws or pulls on the coupling flexure 78 and causes it to translate laterally (downwards in FIG. 2B), thus moving the movable part 60 in a direction substantially orthogonal to the direction of the SMA wire 80, as well as deforming (or bending) under tension, moving the movable part 60 slightly away from the central position.

As shown in FIG. 2B, rotation of the flexure body 74 results in a greater movement $d_{mp}$ of the movable part 60 in the x-y plane than the amount of contraction in the SMA wire $d_{wire}$. That is, the flexure arrangement 72 effectively functions as an amplifying mechanism that advantageously amplifies the range of lateral lens carriage movement (e.g. the stroke), and thus may provide an improved OIS performance.

Referring to FIG. 2B, the amplification of the range of movement is largely dependent on the orientation of the amplifying flexure 76 with respect to the direction of contraction of the SMA wire 80. More specifically, the amplification largely depends on an angle α between the SMA wire 80 and the amplifying flexure 76 as it extends away from the flexure body 74. A smaller angle α enables the flexure arrangement 72 to translate a given SMA wire strain $d_{wire}$ into a greater displacement $d_{mp}$ in the flexure body 74, which in turn is transferred through the coupling flexure 78 to the movable part 60 of the actuator assembly. For the purpose of achieving displacement amplification (at the expense of reduced force), the angle α is preferably less than 45°. The angle α may be at least 20° to ensure the force arising from SMA wire contraction is sufficient to drive rotation in the flexure body 74. Preferably, the angle α is within a range from 30° to 35°.

For the purpose of achieving force amplification (at the expense of reduced movement), on the other hand, a larger angle α, e.g. a >45°, may cause a decrease of displacement of the movable part 60, with an increase in the actuating force. In some cases, such an arrangement is preferable, for example when moving heavier lenses or image sensors.

The amplification of the range of movement is also dependent on the positions of the coupling flexure 78 and the SMA wire 80 at the flexure body 74 relative to the first connection point 56. That is, a change in their respective positions changes the function of the lever as offered by the flexure arrangement 72, thus changing the degree of movement amplification in the movable part 60.

Therefore, when considering the flexure arrangement as a lever, such degree of amplification may be broadly quantified by comparing the location of the force input and the force output relative to the first connection point. Referring to FIG. 2B, the SMA wire 80 extends at a first offset $d_1$ from the first connection point and the coupling flexure 78 extends at a second offset $d_2$ from the first connection point. The amplification ratio, $R_A$, may be defined by $d_2/d_1$. In the present invention, $R_A$ may be taken to be at least greater than 1, or at least 1.2, or at least 1.5, or at least 2.

FIG. 3 is an enlarged perspective view of an alternative pair of flexure arrangements 772a, 772b, acting as actuator units. The flexure arrangements 772a, 772b are functionally similar to the flexure arrangements 72a-d shown in FIGS. 2A and 2B, apart from having a modified flexure arrangement design for the purpose of providing the force-modifying mechanism.

Taking flexure arrangement 772a as an example, the three main components, flexure body 774, amplifying flexure 776, and coupling flexure 778 are formed separately and welded together by weld 90. However, in general, any two or all of these main components may be formed integrally.

The amplifying flexure 776 comprises a planar portion extending in the X-Y plane for connection to a raised portion of the conductive component (not shown) at a first connection point 66. In the illustrated embodiment, the pair of flexure arrangements 772a, 772b are arranged adjacent to each other, thus they each have a respective first connection point 66. In other embodiments, they may be stacked and welded to the same first connection point 66.

The amplifying flexure 776 further comprises a flexure element that is compliant in the X-Y direction but not in the Z direction. The flexure element extends perpendicularly to the planar portion such that the amplifying flexure 776 is much wider along the optical axis than it is in the X-Y plane, as shown in FIG. 3. A thicker flexure element may provide a larger biasing force in the X-Y plane but increases the resistance to bending. Thus, it is preferred to provide a thinner flexure element to ensure its compliance in the X-Y direction, e.g. to be less stiff than the coupling flexure 778.

As apparent from FIG. 3, the amplifying flexure 776 may be made relatively short, for example relative to the flexure body 774. With reference to FIG. 3, the amplifying flexure 776 may be made shorter and the flexure body may be made longer, for example such that the length of the flexure body is longer than, preferably at least twice as long as, the amplifying flexure in the direction along the amplifying flexure and perpendicular to the direction of bending of the amplifying flexure. This allows the point of flexing to be more localized compared to a situation in which the amplifying flexure is relatively long. Movement of the actuator unit may thus be more predictable and control of the actuator unit may be simpler. In some embodiments, the amplifying flexure may be replaced by any element capable of allowing the flexure body 774 to pivot about a pivot point on the support structure.

FIGS. 4A and 4B respectively show an exploded perspective view and a plan view of the SMA actuator assembly 102 according to another embodiment of the present invention. The SMA actuator assembly 102 is structurally and functionally similar to the SMA actuator assembly 2 as shown in FIGS. 2A and 2B, apart from having a modified flexure arrangement 172.

The SMA actuator assembly 2 comprises plural plain bearings 56 spaced around the optical axis O to bear the movable part 60 on the support component 52. The plain bearings 56 are formed integrally with the support component 52, for example by etching the surface of the support component 54. The plain bearing 56 comprises a polymer coating for reducing friction and/or increasing the longevity of the plain bearings 56. In general, however, any suitable bearing arrangement that is capable of supporting the movable part 60 on the support structure 50 may be used. Examples of suitable bearing arrangements are provided with reference to FIG. 2.

As shown in FIGS. 4A and 4B, two pairs of actuating units (in the form of flexure arrangements 172*a-d*) are each provided on diagonally opposing corners of the body portions, and away from the corners with support portions for the static crimps. The flexure arrangement pairs are each stacked along with the optical axis O and in a mirrored configuration. Each flexure arrangement 172 comprises a flexure body 174 connected to an amplifying flexure 176 and a coupling flexure 178. In this example, the flexure body 174 is integrally formed with the flexure arms 176, 178. In other embodiments, one or both of the flexure arms 176, 78 may be affixed to the flexure body 174 by welding, adhesive or any suitable mechanical means.

Figure 5A:
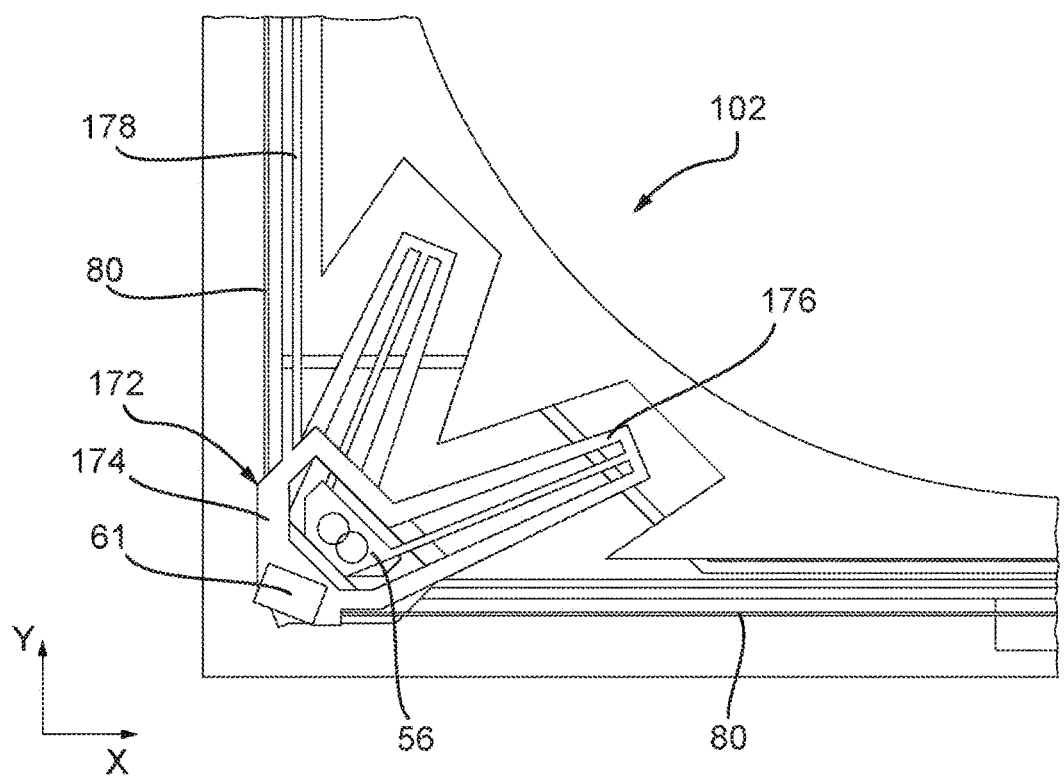
FIG. 5A is an enlarged top plan view showing an actuator unit of the SMA actuator assembly illustrated in FIG. 4B.

As shown in detail in FIG. 5A, each flexure body 174 comprises a rigid frame with a movable crimp 61 fixedly attached on the rigid frame. The movable crimp 61 crimps a second end of the respective SMA wire 80 so as to electrically and mechanically connect the flexure arrangement 172 to the support structure 50. The SMA wires 80 may extend perpendicular to the optical axis O or inclined at a small angle to the plane perpendicular to the optical axis O. In the embodiment of FIG. 5A, the flexure body 174 entirely surrounds the amplifying flexure 176 when viewed in the x-y plane. The flexure body 174 is relatively stiff and resists deformation, thus as acting as a compression load-bearing member.

The amplifying flexure 176 is fixedly attached to the conductive component 54 at a first connection point 56. In the depicted embodiment, the first connection point 56 is positioned at, or towards, the corner of the conductive component 54, with the amplifying flexure 176 extending away from said corner. As shown in FIG. 5A, the entire length of the amplifying flexure 176 is enveloped in the rigid frame of the flexure body 174, so the amplifying flexure 176 co-extends with a portion of the flexure body 174. The position of the first connection point 156, as well as the length and orientation of the amplifying flexure 176, may vary in other embodiments to achieve different levels of displacement amplification of the movable part 60.

The coupling flexure 178 is fixedly attached to the movable part 60 at a second connection point 66. The second connection point 66 is shown positioned along an edge of the movable part 60 and away from the corner with the first connection point 56. Because of the mirrored arrangement in the flexure arrangement pairs 172*a,b* and 172*c,d*, each major side surface of the movable part 60 has a coupling flexure 178 attached at a respective second connection point 66, wherein the coupling flexures 178 are configured to drive movement of the movable part 60 in different directions perpendicularly to each other.

When the SMA wire 80 is not energised, i.e. when the SMA actuator 2 is unactuated and the movable part 60 is at the central position, each coupling flexure 178 generally extends in parallel to the corresponding major side surface of the movable part 60. In some other embodiments, the second connection point 66 may be positioned away from the edge and towards the aperture of the movable part 60, and/or the length and orientation of the coupling flexure 78 may vary to allow for different levels of displacement amplification in the movable part 60.

In the exemplified embodiment, the amplifying and coupling flexures 176, 178 are integrally formed with the flexure body 174. Furthermore, the crimp 61 is also integrally formed with the flexure body 174. That is, the components of the flexure arrangements 172 are made from the same material. The amplifying and coupling flexures 176, 178 are configured to be thinner in width in the X-Y plane when compared to the rigid frame of the flexure body 174. Thus, the two flexure arms 176, 178 are flexible, or at least less stiff than the flexure body 174. As a result, when the SMA wire 80 contracts, the SMA wire 80 draws on the flexure body 174 and causes the flexure arms 176, 178 to deform (or bend) in a direction in the X-Y plane, without also deforming the flexure body 174.

In some other embodiments, one or both of the amplifying and coupling flexures 176, 178 may be formed separately to the flexure body. The one or both of the amplifying and coupling flexures 176, 178 may preferably attach to the flexure body 174 by adhesive, althouhg such connection may be formed by any other techniques such as welding and mechanical means.

Figure 5B:
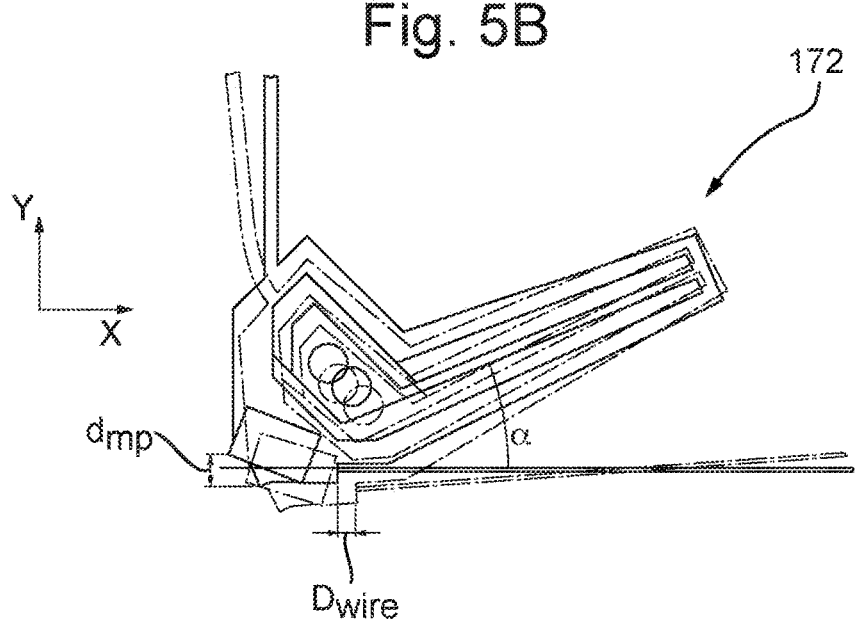
FIG. 5B illustrates the movement of the actuator unit illustrated in FIG. 5A.

FIG. 5B shows the range of movement of flexure arrangement 172 upon actuation of the SMA wire 80. On heating of the SMA wire 80, the strain in the SMA wire 80 increases. This causes the SMA wire 80 to contract, thus drawing the flexure body 174 towards the direction of wire contraction, as shown in dotted lines. Contraction of the SMA wire 80 is amplified by the amplifying flexure 176 and the resulting actuating force transferred via the coupling flexure 178 to the movable part 60 in the manner already described with reference to FIG. 2. The embodiment of FIGS. 4 and 5 thus provides an alternative flexure arrangement 172 as an actuating unit for achieving displacement or force amplification.

Compared to the embodiments of FIGS. 2 and 3, in FIGS. 4 and 5 the amplifying flexure is placed in tension (rather than compression) upon contraction of the SMA wire 80. This may avoid or at least reduce the risk of buckling of the amplifying flexure 176, thus allowing the use of larger actuating forces and/or improving the reliability of the actuating unit.

Figure 6:
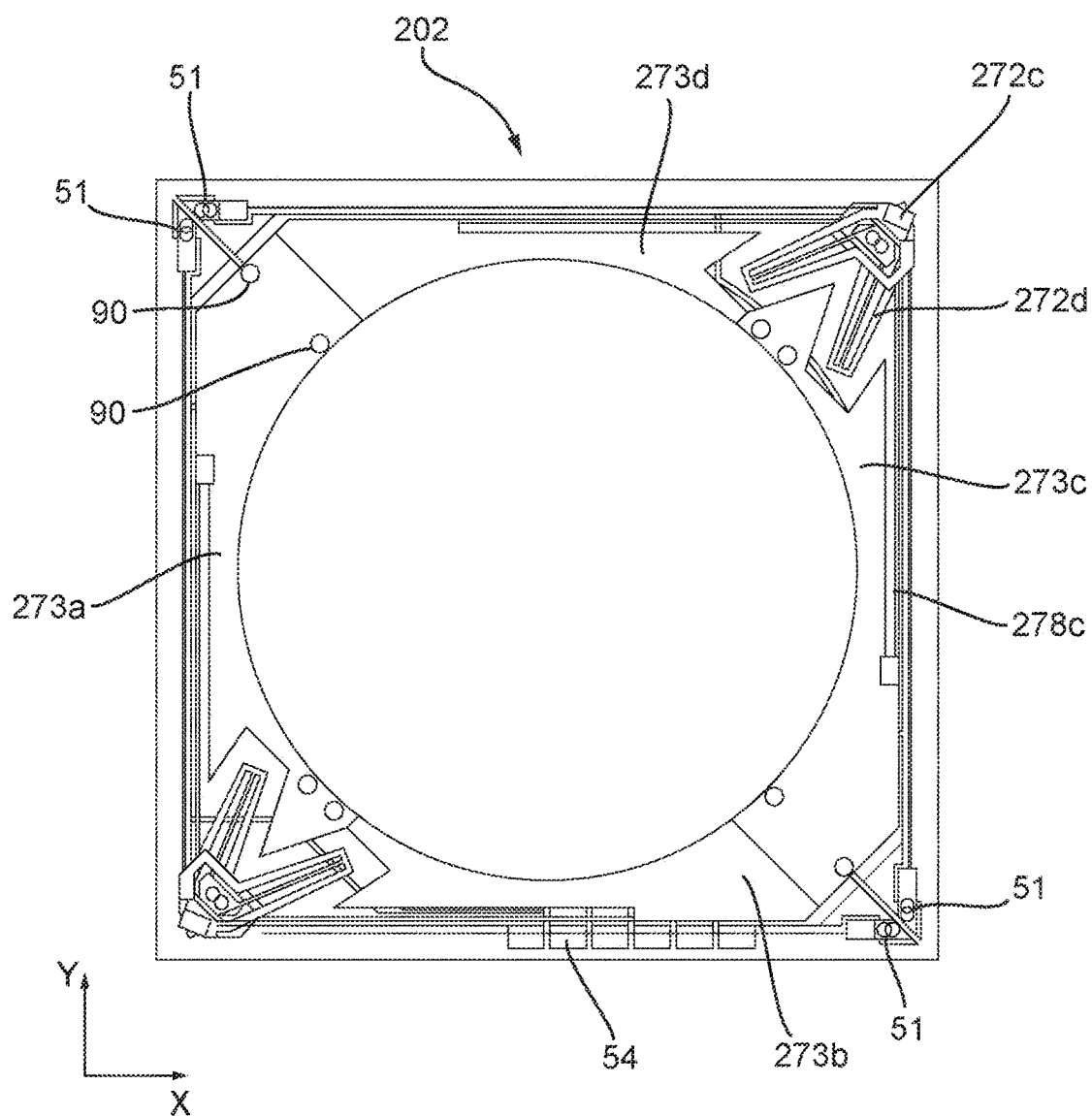
FIG. 6 is a top plan view of an SMA actuator assembly according to another embodiment of the present invention.

FIG. 6 is a top plan view of an SMA actuator assembly 202 according to another embodiment of the present invention. The SMA actuator assembly 202 is structurally and functionally similar to the SMA actuator assembly 102 of FIGS. 4A and 4B, except for the provision of movable portions 273a-d formed integrally with a respective coupling flexure 278. The movable portions 273a-d are welded together at welds 90 to form the movable part 60. Other suitable techniques such as adhesive or mechanical joints may be used in place of the welds 90. Advantageously, such an arrangement does not require precise positioning of the coupling flexures 278 relative to their respective second connection points 66 prior to welding. Rather, the movable portions 273a-d are assembled with the coupling flexures 278 already in their required positions. Thus, such an arrangement enables a more efficient assembly process, as well as a more precise alignment between the coupling flexures 278 and their respective second connection points 66. In some other embodiments, the flexure arrangements 272 and the movable part 60 are integrally formed.

Figure 7A:
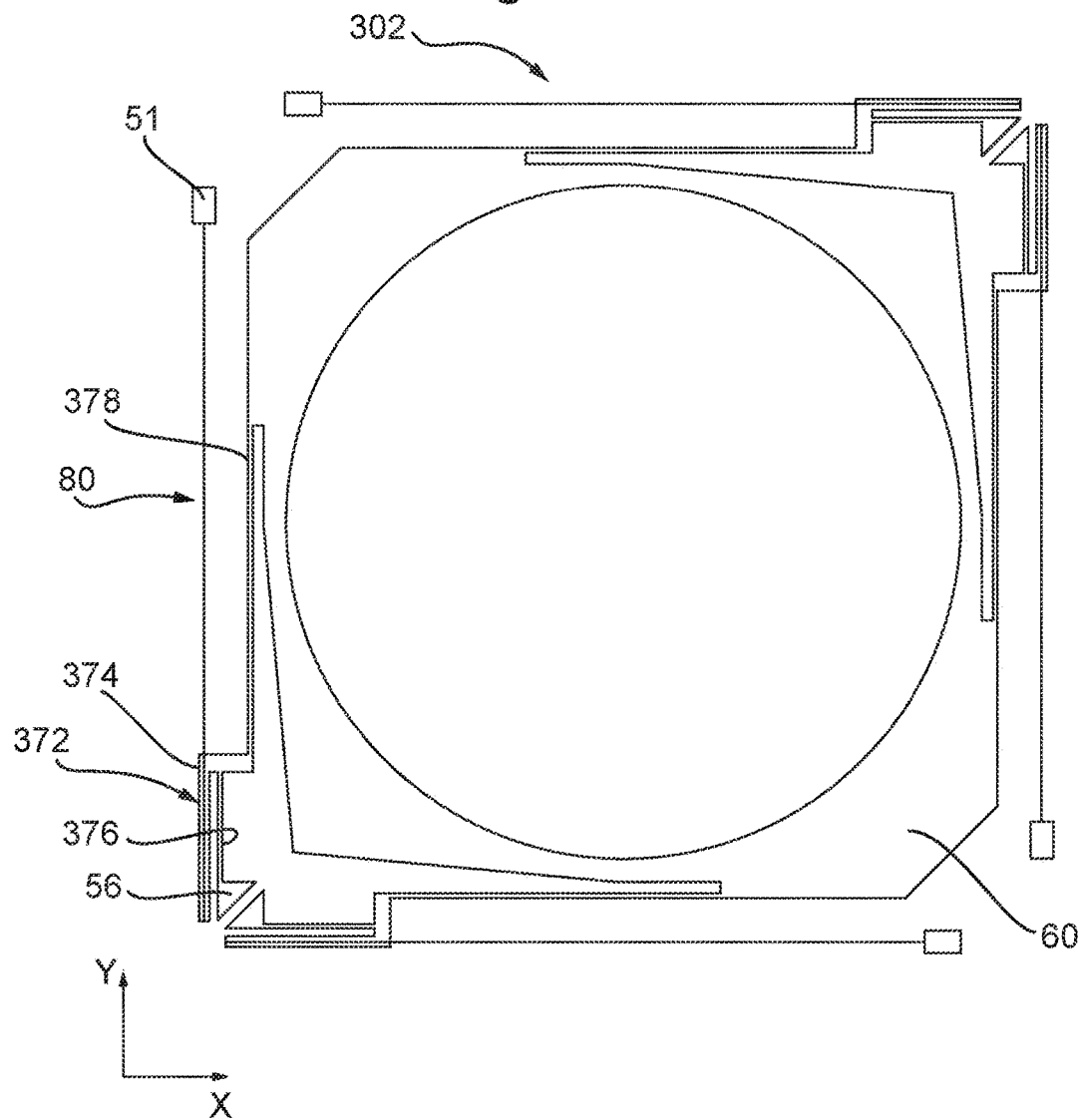
FIG. 7A is a top plan view of an SMA actuator assemblyaccording to another embodiment of the present invention.

FIG. 7A is a top plan view of a flexure arrangement 372 of an SMA actuator assembly 302 according to another embodiment of the present invention. For purely illustrative purposes, the support structure 50 is not shown in FIG. 7A. The SMA actuator assembly 302 is structurally and functionally similar to the SMA actuator assembly 2 of FIGS. 2 to 4, apart from having a modified flexure arrangement 372, as well as optionally an integrated flexure arrangement 372 and movable part 60. The flexure arrangement 372 as featured in the SMA actuator 302 utilises a different lever system compared to SMA actuator assemblies 2, 102, 202 described with reference to FIGS. 2 to 4. More specifically, the flexure arrangement 372 comprises a amplifying flexure 374 extending parallel to and offset from the SMA wire 80.

In the exemplified example, the flexure arrangement 372 comprises an "L" shaped flexure body 374 with a first (shorter) flexure body portion and a second (longer) flexure body portion perpendicularly joined at their ends. The SMA wire 80 is attached at a moving crimp providing on a free end of the second flexure body portion, and away from the first flexure body portion. That is, a part of the SMA wire 80 runs along the length second flexure body portion.

The end of the first flexure body portion that is away from the second flexure body portion is connected to a coupling flexure 378. Optionally, the coupling flexure 378 is integrally formed with the movable part 60. The coupling flexure 378 extends along a major side surface of the movable part 60 and is configured to, during SMA wire 80 contraction, deform and transfer motion in the flexure body 374 onto the movable part 60. When the SMA wire 80 is not energised, the coupling flexure 378 is configured to bias the movable part 60 towards its central position.

The amplifying flexure 376 projects from the first flexure body portion and coextends with the second flexure body portion. In the depicted embodiment, the amplifying flexure 372 is arranged to have the same length as the second flexure body portion, although that is not necessary in general. In other embodiments, the length of the amplifying flexure 376 may be different from the second flexure body portion, in other words, the position of the moving crimp 61 relative to the first connection point 56 may be different, which gives rise to different amplification performance.

The amplifying flexure 376 is positioned with an offset from the second flexure body portion. More specifically, the amplifying flexure 372 projects from the first flexure body portion at a location defined by an offset from the second flexure body portion. The offset illustrated in this example is about a quarter of the length of the first flexure body portion. In other embodiments, the offset may vary to provide different amplification performance. For example, a shorter offset may result in a higher degree of amplification in the movement in the movable part 60.

In the illustrated embodiment, the flexure body 374, the amplifying flexure 376, the coupling flexure 378 and the movable part 60 are integrally formed. In some other embodiments, two or more of these components are affixed by welding or other suitable means.

Figure 7B:
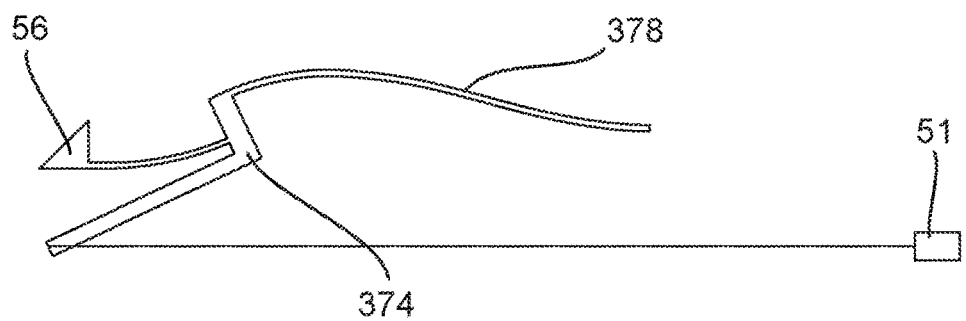
FIG. 7B is an enlarged top plan view showing the actuator unit of the SMA actuator assembly illustrated in FIG. 7A.

FIG. 7B is an enlarged top plan view showing the deformation in the flexure arrangement 372 when the SMA wire 80 is energised. Similarly to the other embodiments, as the SMA wire 80 is energised and contracts, the SMA wire 80 draws or pulls on the flexure body 374. Under compression, the amplifying flexure 376 bends and causes the flexure body 374 to rotate about and translate relative to the first connection point 56. The flexure body 374 may act as a lever where the end connecting the coupling flexure 378 moves by a greater distance than the amount of contraction in the SMA wire 80. Thus, the flexure arrangement 372 amplifies the movement of the movable element 60.

Figure 8:
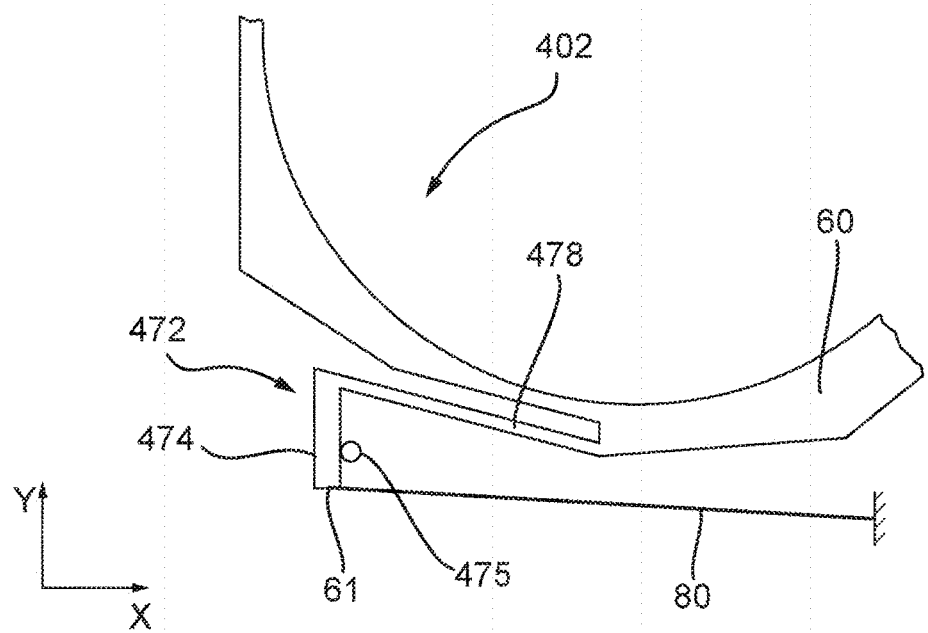
FIG. 8 is an enlarged top plan view showing an actuator unit according to another embodiment of the present invention.

FIG. 8 is an enlarged top plan view of a flexure arrangement 472 of an SMA actuator assembly 402 according to another embodiment of the present invention. For purely illustrative purposes, the support structure 50 is not shown in FIG. 8. The SMA actuator assembly 402 is structurally and functionally similar to the SMA actuator assembly 302 of FIGS. 7a and 7b, apart from having a modified flexure arrangement 472, where the amplifying flexure in SMA actuator 302 is replaced by a pivot 475.

In the illustrated embodiment, the flexure arrangement 472 comprises an elongate flexure body 474. Said flexure body 474 has a coupling flexure 478 connected at one end of the flexure body 474 and a moving crimp 61 connected at the other end. In some other embodiments, an "L" shaped body similar to the SMA actuator 302 may be used, where a second flexure body portion extending away from a first flexure body portion may be used for varying the degree of movement amplification.

The flexure body 474 comprises a pivot 475 electrically and mechanically connected to the conductive component at a first connection point. As the SMA wire 80 contracts, the rigid flexure body 474 rotates about the pivot 475, such that the end of flexure body 474 that is in connection with the coupling flexure 478 moves in an opposite direction to the contraction of SMA wire 80. Such a flexure arrangement effectively acts as a lever where the amplification of movement in movable element 60 depends upon the position of pivot 475 with respect to the two ends of the elongate flexure body 474, e.g. the distance $d_a$ to the crimp 61 and the distance $d_b$ to the coupling flexure 478. To provide any amplification in the movement of the movable part 60, $d_a/d_b$ must be less than one. $d_a/d_b$ may be in the range of 0.1 to 0.9. Preferably, $d_a/d_b$ may be in the range of 0.33 to 0.833 to achieve an amplification ratio of 1.2 to 3.

Although in FIG. 8 the SMA wire 80 and the coupling link (in the form of a coupling flexure 478) are provided on opposite sides of the pivot 475, in general the SMA wire 80 and the coupling link may be provided on the same side of the pivot 475. For example, the coupling link may be placed under compression upon contraction of the SMA wire 80, thus transferring the actuating force to the movable part 60. This is particularly advantageous in embodiments in which the coupling link comprises a mechanism that is to be placed under compression, such as a ball bearing or plain bearing.

Figure 9:
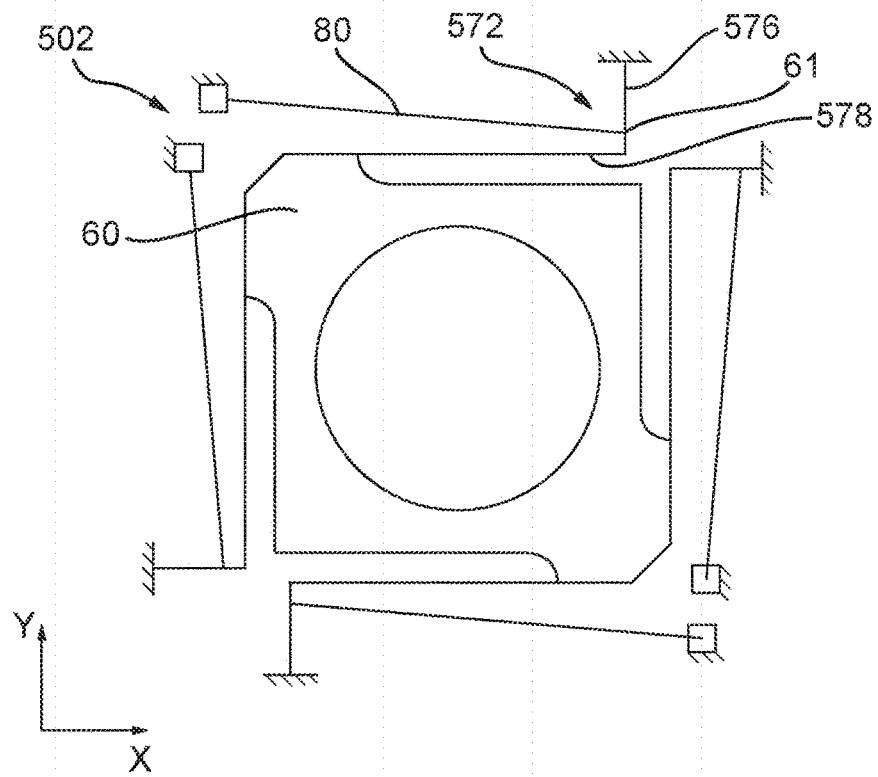
FIG. 9 is a top plan view showing an SMA actuator assembly according to another embodiment of the present invention.

FIG. 9 is a top plan view of a flexure arrangement 572 of an SMA actuator 502 according to another embodiment of the present invention. For purely illustrative purposes, the support structure 50 is not shown in FIG. 9. The SMA actuator assembly 502 is structurally and functionally similar to the SMA actuator assembly 402 of FIG. 8, apart from having a modified flexure arrangement 572, where the class 1 lever system offered by the pivot 475 is replaced by a class 3 lever system.

In the illustrated embodiment, the flexure arrangement 572 comprises a flexure body connecting a amplifying flexure 576 and a coupling flexure 578. The amplifying flexure 576 is electrically and mechanically connected to the conductive component 52 of the support structure 50. The amplifying flexure 574 comprises a moving crimp 61 along its length that is attached to an SMA wire 80. As the SMA wire 80 contracts, the flexure body rotates about the first connection point, such that the coupling flexure 578 moves in the substantially same direction as the direction of contraction of the SMA wire 80.

Such a flexure arrangement effectively acts as a lever where the amplification of movement in movable element 60 depends upon the position of moving crimp 61 with respect to the two ends of the amplifying flexure 576, e.g. the distance $d_c$ to the first connection point and the distance $d_d$ to the coupling flexure 478.

In FIG. 9, the amplifying flexure 576 may effectively be replaced by a rigid flexure body that is pivotally connected at the first connection point. The pivot may be embodied by a (short) flexure, for example.

Figure 10:
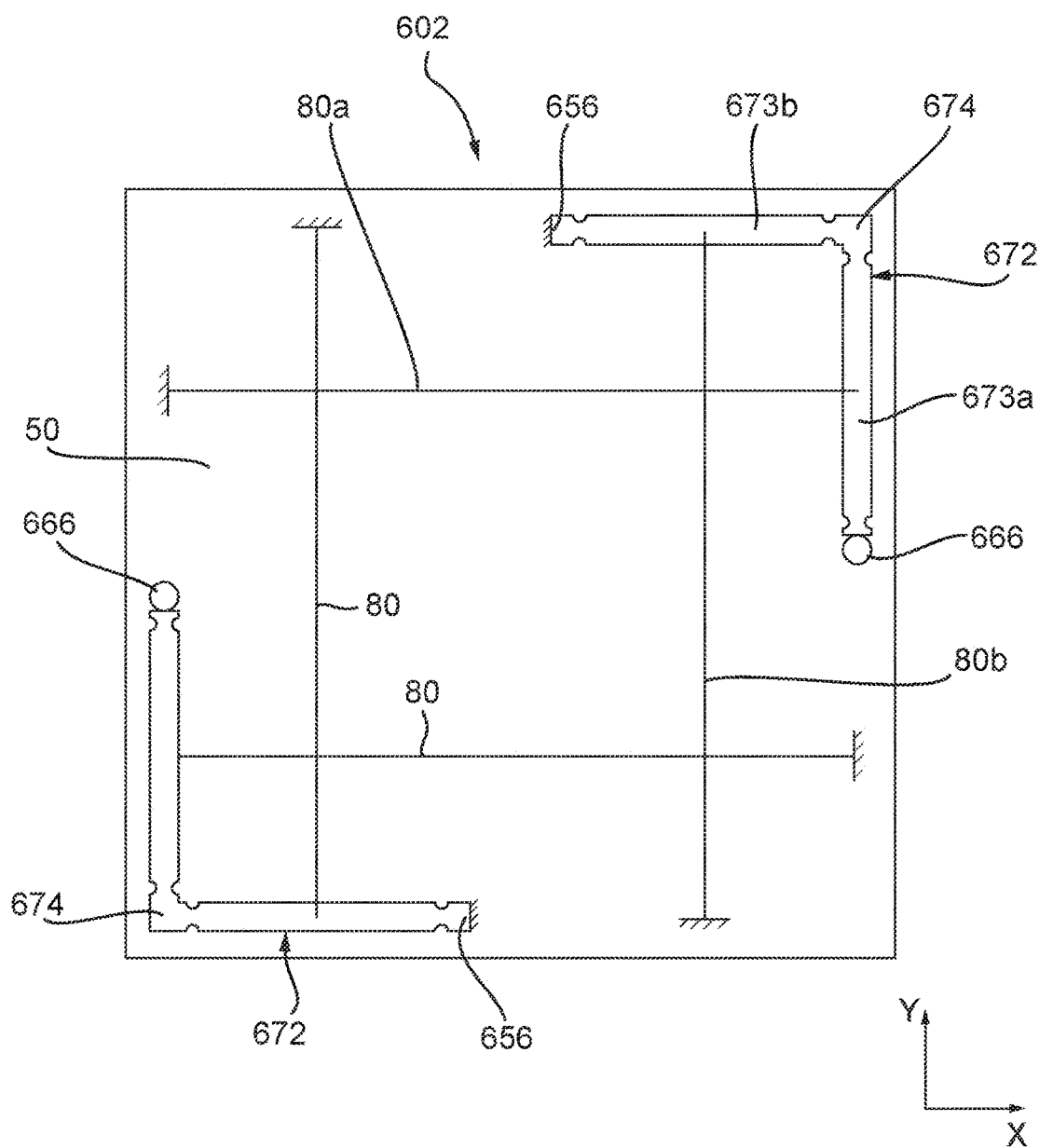
FIG. 10 is a top plan view showing an SMA actuator assembly according to another embodiment of the present invention.

FIG. 10 is a top plan view of a flexure arrangement 672 of an SMA actuator assembly 602 according to another embodiment of the present invention. For ease of illustration, the movable part 60 is not shown in FIG. 10. The SMA actuator assembly 602 comprises two flexure arrangements 672 each connected with a pair of perpendicularly arranged SMA wires 80. That is, the flexure arrangement 672 uses a single flexure for providing displacement amplification in two directions.

The flexure arrangement 672 comprises two flexure arms 673a, 673b connected with two adjacent sides of a flexure body 674. The two flexure arms 673a, 673b extend perpendicularly from each other so as to form an "L" shaped flexure. The two ends of the "L" shape flexure 672 each attached to one of the movable part 60 and the conductive component 52 of the support structure 50.

In the illustrated embodiment, each of the flexure arms 673a, 673b comprises a moving crimp 61 provided at respective midpoints. Thus, each of the flexure arms 673a, 673b has an SMA wire 80a, 80b extending perpendicularly to its length. Taking one of the flexure arms 673a as an example, as the SMA wire 80a contracts in the X direction, it applies stress on the flexure arrangement 672 and deforms both flexure arms 673a, 673b. This causes the flexure body 674 to rotate about and translate relative to the first connection point 656, thereby increasing the displacement of the movable part in the X-direction. Similarly, taking the flexure arm 673b as an example, as the SMA wire 80b contracts in the Y direction, it applies stress on the flexure arrangement 672 and deforms both flexure arms 673a, 673b. This causes the flexure body 674 to rotate about and translate relative to the first connection point 656, thereby increasing the displacement of movable part in the Y direction.

In other embodiments, the moving crimp 61 may be provided anywhere along the length of the respective flexure arm 673. For example, in the case of wire 80a, when the moving crimp 61 is positioned closer to the flexure body 674, it allows a greater degree of bending in the flexure arms and thus improves the displacement amplification. However, the force for moving the movable part may reduce accordingly.

Figure 11:
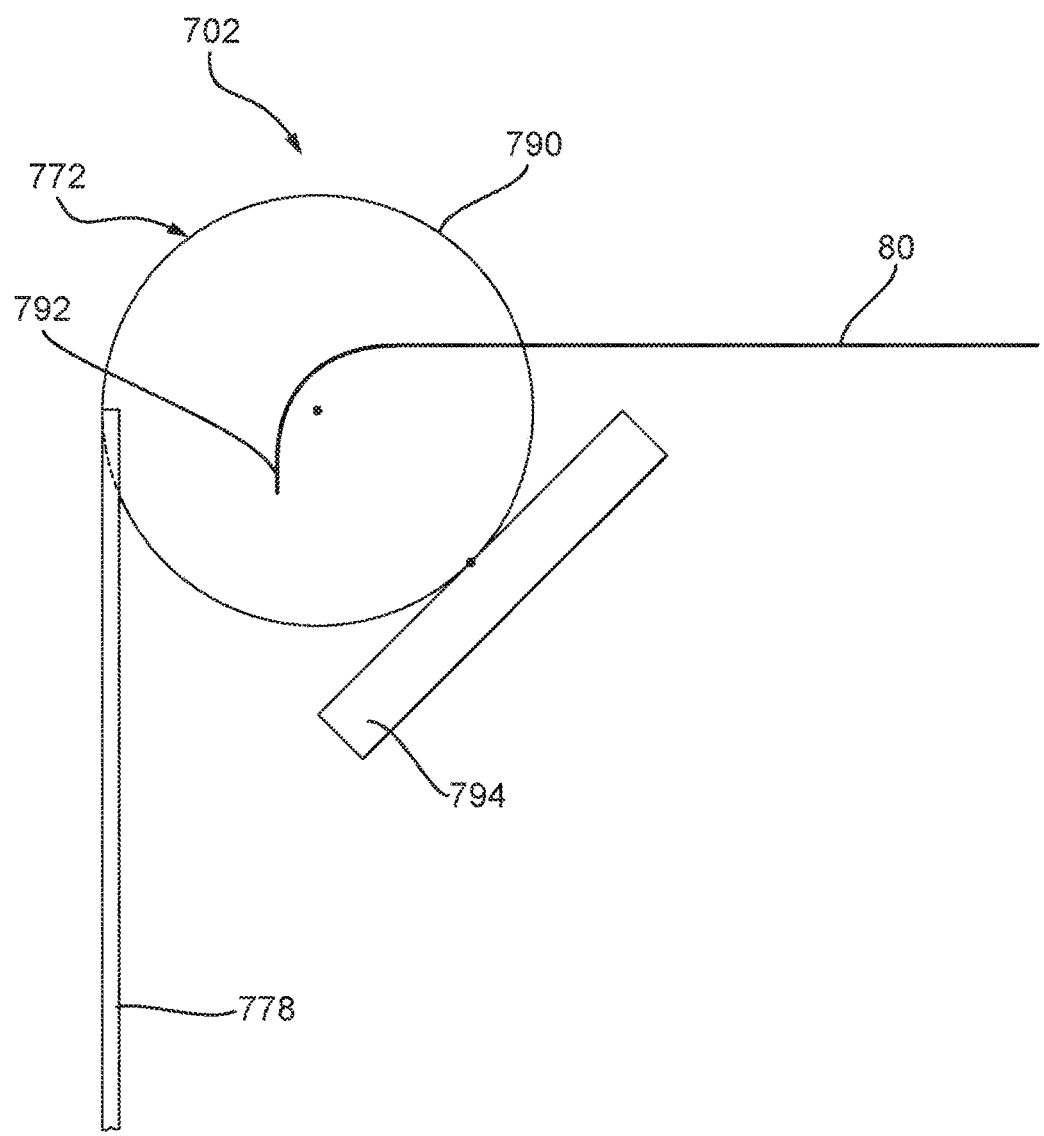
FIG. 11 is a top plan view showing an actuator unit according to another embodiment of the present invention.

FIG. 11 is a top plan view showing an actuating unit 772 according to another embodiment of the present invention. The actuating unit may be provided in place of any of the actuating units and flexure arrangements described above. The support structure and the movable part are not shown for ease of illustration. In this embodiment, the actuating unit comprises a force-modifying mechanism embodied by a roller (instead of an amplifying flexure). The coupling link is embodied by a coupling flexure 778 connecting to the movable part. As described in relation to other embodiments, the coupling flexure 778 transfers an actuating force to the movable part 60, while allowing compliance in a direction perpendicular to the actuating force.

The actuating unit differs from the other embodiments in that it does not comprise a first flexure (or a force modifying flexure) for displacement amplification. Instead, the flexure arrangement 772 in this embodiment comprises a roller 790 connected between the coupling flexure 778 and the SMA wire 80.

The roller 790 is preferably a cylindrical body, but its side surface could alternatively comprise different curvatures, e.g. the roller may be an oval-shaped body which allows the movement in the movable part to relate non-linearly to the contraction in the SMA wire 80. The side surface of the roller 790 is configured to roll on a corresponding surface of a guide 794 which extends from the support structure.

More specifically, the roller 790 contacts the guide at a contacting point. The guide 794 may form integrally with, or adhered to, the support structure. The guide 794 is shown having a straight profile but it could alternatively comprise a curve, so as to allow the movement in the movable part to relate non-linearly to the contraction in the SMA wire.

The majority of the SMA wire 80 extends perpendicularly to the coupling flexure 778. The SMA wire 80 is attached to the roller 790 at an off-centre position. As the SMA wire 80 contracts, it exerts an input force on the roller 790, causing it to roll on the guide 794. As such the roller 790 rotates (in the clockwise direction) it draws on the coupling flexure 778 and thereby exerts an actuating force on the movable part 60.

Similarly to the first embodiment, the relative separation between the contacting point (between the roller 790 and the guide 794) and the respective positions where the SMA wire 80 and coupling flexure 778 are connected to roller 790 affect the degree of amplification in displacement. Moreover, the angle of the guide relative to the SMA wire 80 and/or the coupling flexure 778 may affect the degree of amplification in displacement.

Figure 12A:
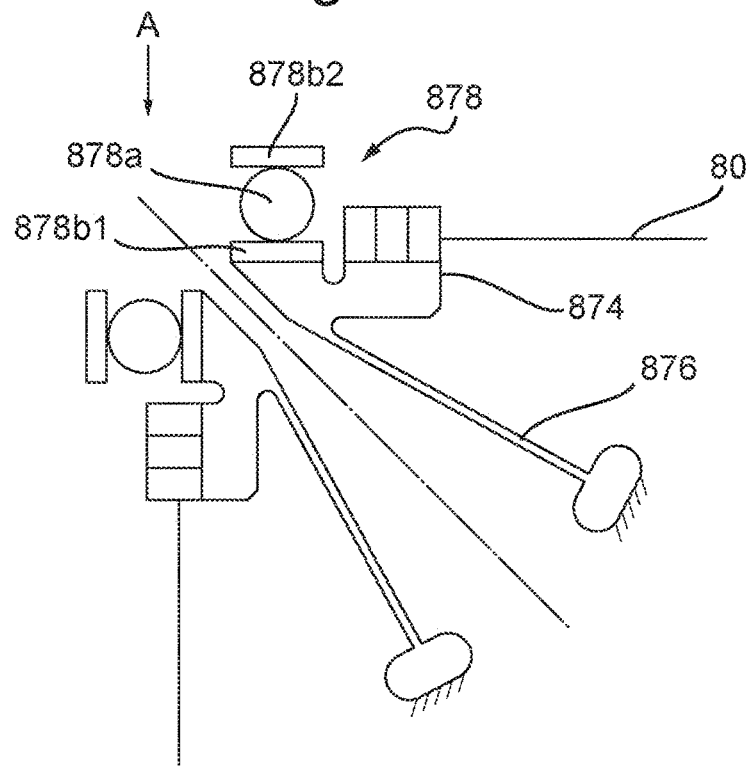
FIGS. 12A-C are schematic views showing an actuator unit according to another embodiment of the present invention.
Figure 12B:
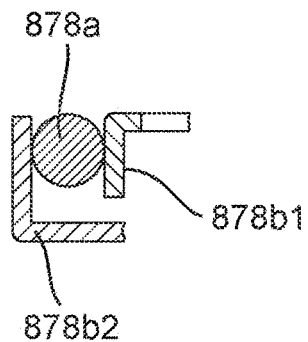
Figure 12C:
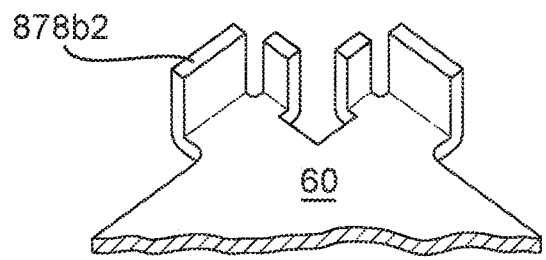

In the embodiments described above, the coupling link of the actuating unit is embodied by a coupling flexure. FIGS. 12A-12C schematically depict an actuating unit in which the coupling link 878 is embodied by a rolling bearing. The coupling link 878 of FIGS. 12A-12C may be provided in place of any of the coupling flexures described above, in particular in arrangements in which the coupling link is placed under compression (rather than tension) upon contraction of the SMA wire 80.

The actuating unit depicted in FIG. 12A comprises a force-modifying mechanism in the form of an amplifying flexure 876, connected at one end to the support structure 50 and at another end to the flexure body 874. The SMA wire 80 is connected between the flexure body 874 and the support structure 50, so as to move the flexure body 874 relative to the support structure 50 upon contraction. The arrangement of force-modifying mechanism and SMA wire 80 may be as described in relation to the previous embodiments, and thus achieve displacement or force amplification.

The coupling link 878 of FIG. 12A is embodied by a rolling bearing 878. The rolling bearing 878 comprises a rolling element 878a. The rolling element 878a may be a roller or a ball, for example. The rolling element 878a bears on a bearing surface 878b1 on the force-modifying mechanism, in particular on the flexure body 874. The rolling element 878a further bears on a bearing surface on the movable part 60. Upon contraction of the SMA wire 80, the rolling bearing 878 is placed under compression, and the actuating force is transferred from the force-modifying mechanism, via the bearing surfaces 878b and the bearing element 878a, to the movable part 60. Furthermore, the rolling bearing 878 achieves compliance in a direction orthogonal to the actuating force.

FIG. 12B schematically depicts a side view of the rolling bearing 878, and FIG. 12C depicts a perspective view of the bearing surface 878b2 on the movable part 60. As shown, the bearing surfaces 878b1, 878b2 may respectively be formed integrally with the force-modifying mechanism and with the movable part 60. The bearing surface 878b2 on the movable part 60 may be formed, for example, by a 90 degree bend in a sheet metal part forming the movable part 60. The bearing surface 878b1 on the force-modifying mechanism may be formed, for example, by a 90 degree bend in a sheet metal part forming the flexure body 874 and optionally the amplifying flexure 876. In general, the bearing surfaces 878b1, 878b2 may extend perpendicular to the direction of the actuating force imparted bu the actuating unit on the movable part 60.

Although not shown, the rolling element 878a may be omitted in some embodiments, such that the bearing surfaces 878b1, 878b2 bear directly onto each other. The coupling link may thus be embodied by a plain bearing or sliding bearing. The plain bearing may comprise a friction-reducing material, such as a liquid or solid lubricant, between the bearing surfaces 878b1, 878b2.

Flexure Stiffness Reduction

In several of the above-described embodiments, an SMA wire 80 is used to deform a flexure arm. For example, in the embodiments of FIGS. 2-6, 9 and 12, contraction of the SMA wire 80 leads to deformation of the amplifying flexure. In general, many other SMA actuator assemblies may comprise flexure arms that are deformed upon contraction of the SMA wire 80. The intrinsic stiffness or spring constant of such flexure arms may resist bending of the flexure arms, and thus provide a force opposing contraction of the SMA wire 80. As such, the resultant force imparted by the SMA wire 80 on the movable part 60, and thus the usable force for moving the movable part 60 relative to the support structure 50, is reduced compared to a situation in which the flexure arms do not resist bending.

One way to reduce the resistance to SMA wire contraction by the flexure arm is to reduce the intrinsic stiffness or spring constant of the flexure arm in a direction parallel to the SMA wire 80. This may be achieved, for example, by making the flexure arm thinner in the direction parallel to the SMA wire 80. However, reducing the thickness of the flexure arm makes the flexure arm more prone to buckling. There is thus an inherent limit on how much the spring constant of the flexure arm can be reduced, without affecting reliability and resistance to damage of the SMA actuator assembly. It may also be desirably to design the flexure stiffness for other purposes, such as providing a biasing force is sufficient to return the movable part to a default position. The intrinsic flexure stiffness may be fixed due to such other considerations.

It is thus desirable to provide alternative means for reducing the effective spring constant of a flexure arm in an SMA actuator assembly.

The inventors have found that the effective spring constant or effective stiffness of a flexure arm, i.e. the resistance to contraction of the SMA wire 80 by the flexure arm, can be reduced by appropriately placing the flexure arm under compression. In embodiments of the present invention, this is achieved by placing the SMA wire 80 under tension in an arrangement in which a compressive force is thus imparted on the flexure arm. The arrangement of SMA wire 80 relative to the flexure arm and the magnitude of the tensional force in the SMA wire is configured such that the effective spring constant of the flexure arm is reduced by 50% or more compared to a situation in which there is no compressive force exerted on the flexure arm. In this context, the effective spring constant is defined in the direction of the force applied by the SMA wire 80 on the flexure arm. The effective spring constant is the ratio of a change in force (in the direction along the SMA wire) imparted by the SMA wire 80 on the flexure arm to the change in location, i.e. the amount of movement or displacement (in the direction along the SMA wire), due to that change in force.

In some embodiments, the effective spring constant is reduced by at least 70%, preferably at least 90%. In particularly preferable embodiments, the effective spring constant is reduced by at least 99%, or by substantially 100%, thus effectively eliminating any effect of the intrinsic stiffness of the flexure arm on the force imparted by the SMA wire 80 for moving the movable part 60.

Figure 13A:
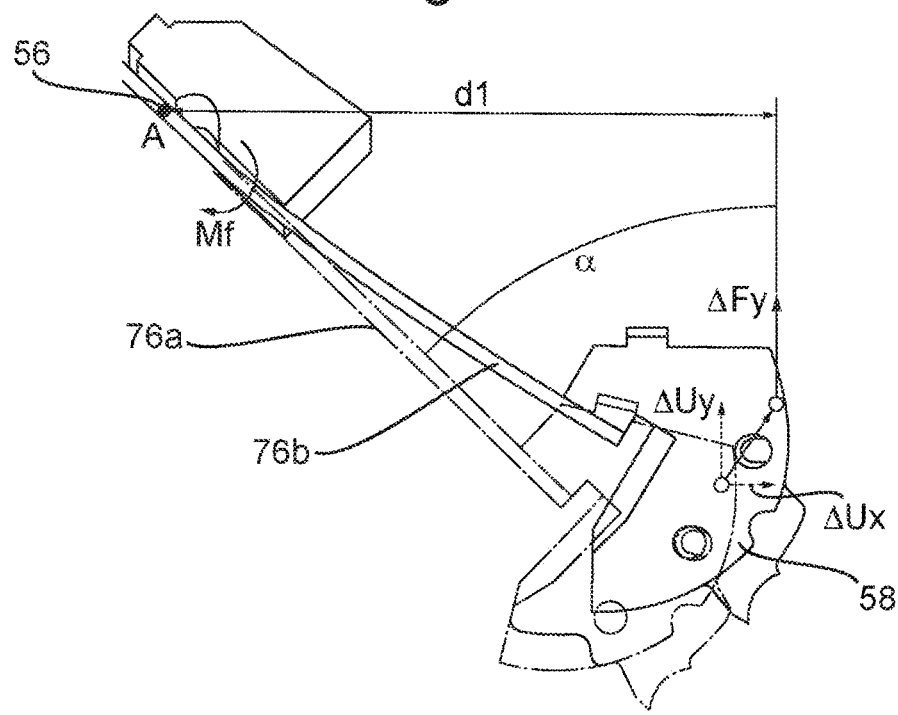
FIGS. 13A, B, and C are schematic views illustrating stiffness reduction in flexure arms.
Figure 13B:
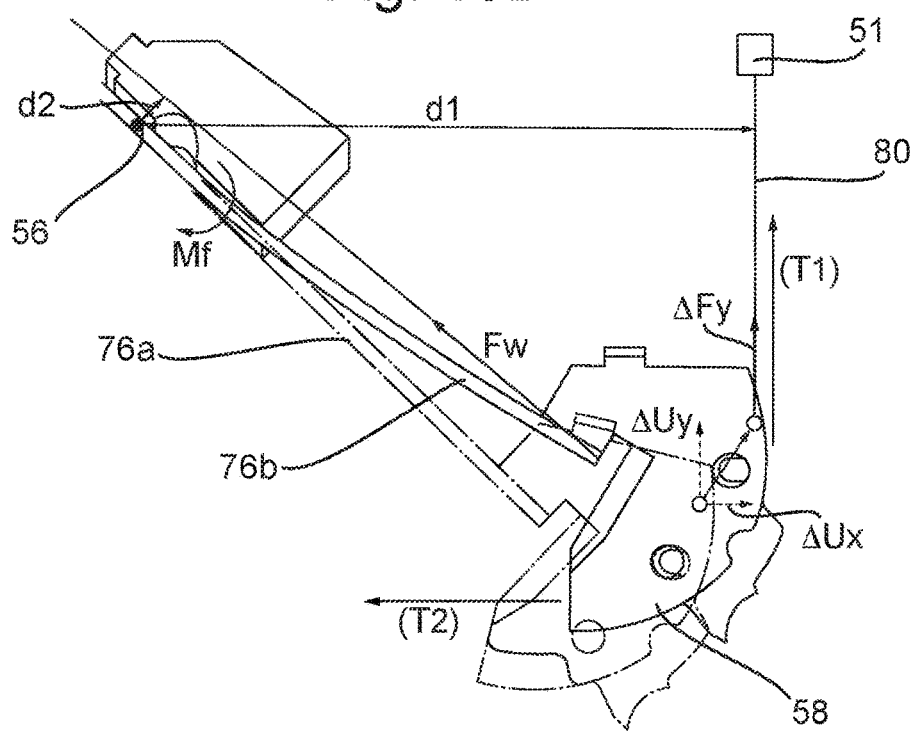
FIG. 13D is a plot of reduction in stiffness versus tension.

FIGS. 13A and 13B, for example, illustrate a flexure arm 76. The flexure arm 76 comprises a fixed end 56 that is fixed relative to the support structure (an example of a "first part"). The flexure arm 76 further comprises a movable end 58 that is movable relative to the fixed end 56 upon bending or flexing of the flexure arm 76. The movable end 58 is coupled to an SMA wire 80. The SMA wire 80 is connected between the support structure and at the movable end 58 of the flexure arm 76. The flexure arm 76 may, for example, correspond to the amplifying flexure of any of the preceding embodiments. Although not shown, the movable end of the flexure arm is coupled to the movable part, thereby moving the movable part upon contraction of the SMA wire. The movable end of the flexure arm may be coupled to the movable part by any mechanism capable of transferring an actuating force from the flexure arm 76 to the movable part. For example, there may be provided a coupling link or another portion of SMA wire between the movable end of the flexure arm and the movable part.

FIGS. 13A and 13B illustrates the movement in the flexure arm 76 before (indicated by $76_a$) and during ($76_b$) the actuation of the SMA wire 80.

FIG. 13A illustrates a situation in which no compressive force acts on the flexure arm 76. In this situation, the intrinsic spring constant k of the flexure arm 76 in the direction along the SMA wire 80 can be determined as follows:

$$\text{intrinsic spring constant } k = \frac{\Delta F_y}{\Delta U_y}$$

where $\Delta U_y$ and $\Delta F_y$ respectively are a displacement of the movable end 74 of the flexure arm 76 in a direction along the SMA wire 80 in response to a change in the tensile force $\Delta F_y$ in the SMA wire 80. So, by increasing the tensile force in the SMA wire 80 by $\Delta F_y$ (upon contraction of the SMA wire 80), the movable end 74 moves by $\Delta U_y$.

Put another way, the intrinsic resistance to bending of the flexure arm 76 may be represented by the depicted flexure moment $M_f$. $M_f$ depends on the flexure material and geometry (thickness, length, etc.), and is proportional to the displacement $\Delta U$ of the movable end 74 of the flexure arm. For a given displacement $\Delta U$ of the movable end 74 of the flexure arm 76 (or the degree of flexure arm deformation), the flexure arm 76 has a reaction to restore to its nominal, unloaded position.

Rotational equilibrium around fixed end 56 of the flexure arm 76 is achieved when:

$$M_f - \Delta F_y d_1 = 0 \Rightarrow \Delta F_y = \frac{M_f}{d_1}$$

So, considering that $M_f$ is proportional to the displacement $\Delta U$ of the movable end 54, the force $\Delta F_y$ in the SMA wire 80 required to move the movable end 54 by a displacement $\Delta U_y$ is constant in the absence of any other forces.

FIG. 13B depicts a situation in which the flexure arm 76 is additionally placed under compression. This may be achieved, for example, due to the SMA wire 80 being in tension or tensioned (generally indicated by T1). Such tension in the SMA wire 80 may be achieved by the SMA wire 80 acting against an opposing force (generally indicated by T2), which generally may be due to an opposing spring or an opposing SMA wire 80 or other actuator unit. The resultant force $F_w$, being the vector sum of the forces in the SMA wire 80 T1 and an opposing force T2, places the flexure arm 76 under compression. It is noted that T1 and T2 are depicted for purely illustrative purposes, to indicate how the compressive force $F_w$ arises in practice.

Due to deflection of the flexure arm 76, $F_w$ acts at a distance (e.g. offset) to the fixed end 56 of the flexure arm 76. The compressive force $F_w$ thus adds a moment to the force equilibrium about the fixed end 56. The rotation equilibrium around the fixed end 56 becomes:

$$M_f - \Delta F_y d_1 - F_w d_2 = 0 \Rightarrow \Delta F_y = \frac{M_f}{d_1} - \frac{F_w d_2}{d_1}$$

Thus, the additional force $\Delta F_y$ in the SMA wire 80 to move the movable end 58 of the flexure arm by $\Delta U_y$ upon contraction of the SMA wire 80 is reduced by $(F_w \cdot d_2)/d_1$ compared to the case where the SMA wire 80 is not energised.

Due to the typically small degree of deformation in the flexure arm 76, $F_w$ and $d_1$ may be considered not to vary upon contraction of the SMA wire 80. $M_f$ and $d_2$ are proportional to the total displacement of the end of the flexure arm 76, $\Delta U$ and thus proportional to $\Delta U_y$. As such, the additional force $\Delta F_y$ required to move the movable end 58 is proportional to the displacement $\Delta U_y$, and so the effective spring constant of the flexure arm 76 (when under compression) may also be taken to be approximately constant. The effective spring constant will be less than the intrinsic spring constant of the flexure arm 76.

As such, the effective spring constant, i.e. the resistance to SMA wire contraction due to stiffness of the flexure arm 76, is reduced by placing the flexure arm 76 under compression. The reduction in stiffness can be increased by increasing the compressive force $F_w$ acting on the flexure arm 76.

A mathematical approximation of the reduction of stiffness may be determined based on the assumed identities shown below, which may be assumed to hold for very small deflections of the flexure arm 76, and in situations in which the input force (by the SMA wire) is perpendicular to the output force (to the coupling link, for example):

$$\sin\alpha = \frac{\Delta U y}{\Delta U}; \sin\alpha = \frac{d1}{L}; \cos\alpha = \frac{T}{Fw}; d2 = \Delta U;$$

Resolving for the effective spring constant results in:

Effective spring constant $\frac{\Delta F_y}{\Delta U y} \approx$ $$\text{Intrinsic spring constant} - \frac{T}{L}\frac{1}{\cos\alpha * \sin^2\alpha}$$

where the intrinsic spring constant is the spring constant of the flexure arm in the direction along the SMA wire in the absence of any compressive force acting on the flexure arm, T is the tension in the SMA wire (e.g. when the flexure arm is not undergoing flexing), L is the length of the flexure arm and a is the angle between SMA wire and flexure arm. The effective spring constant reduction is $$\frac{T}{L}\frac{1}{\cos\alpha * \sin^2\alpha}.$$

The above approximation is for a situation in which the input force of the SMA wire is perpendicular to the output force to the movable part. For a more general situation, in which the angle between flexure arm and input force is a and the angle between flexure arm and output force is $\beta$, the equation becomes:

*Eff*. spring constant $\frac{\Delta F_y}{\Delta U y} \approx$ $$\text{Intrinsic spring constant} - \frac{T}{L}\left(\frac{1}{\tan\alpha * \sin\alpha} + \frac{1}{\tan\beta * \sin\beta}\right)$$

Figure 13C:
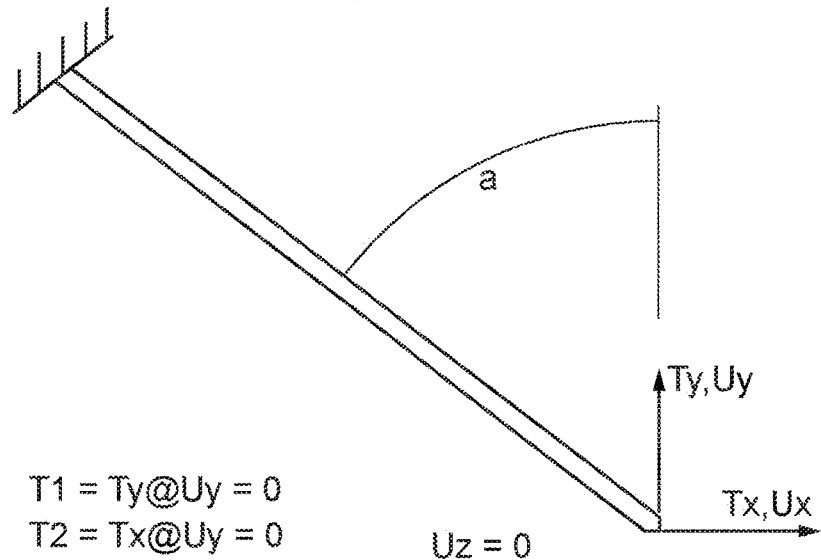
Figure 13D:
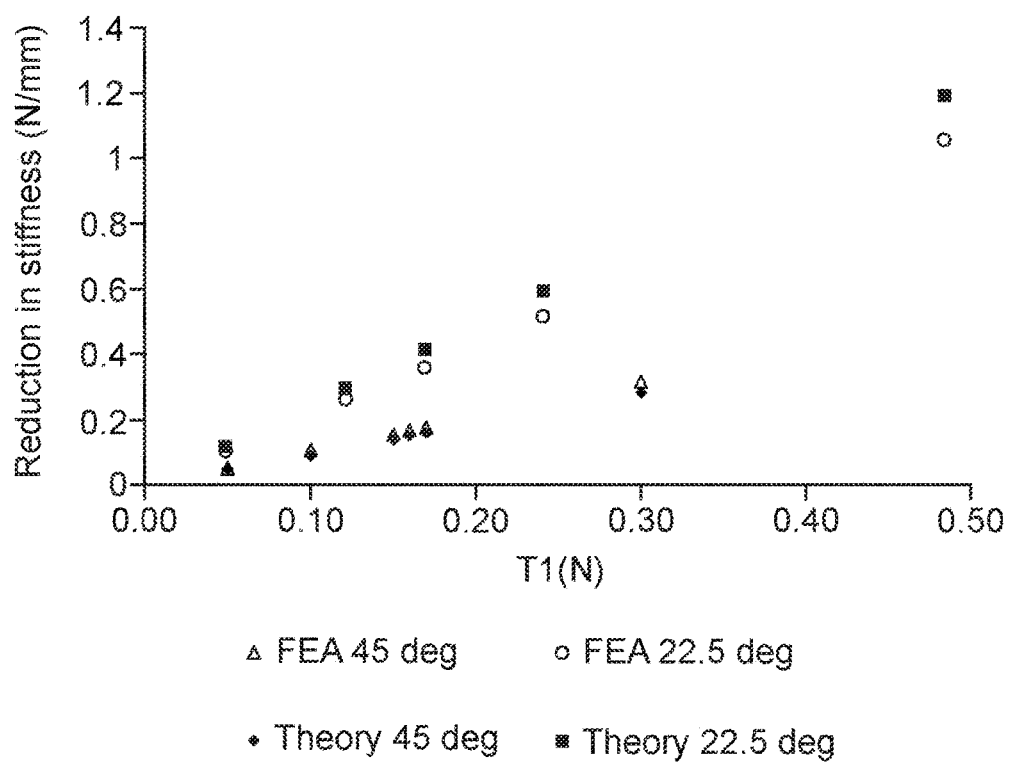

Stiffness reduction has been validated using Finite Element Analysis (FEA) of the arrangement in FIG. 13C, considering a simple cantilever acting as a flexure arm. For the purposes of the FEA, the cantilever was selected to have a rectangular cross section with a width of 0.08 mm and a height (into the page of FIG. 13C) of 0.10 mm. The length of the flexure arm was 3 mm. FEA was carried out for a range of input tensions between 0.05N and 0.5N, and for two different angles $\alpha$ of 45 degrees and of 22.5 degrees. As apparent from FIG. 13D, FEA confirmed a reduction of effective spring constant for increasing tension in the SMA wire, and confirmed the that the mathematical expression for effective spring constant is relatively accurate.

The intrinsic spring constant depends on the material parameters of the flexure arm and is independent of any forces applied to the flexure arm. According to some embodiments of the present invention, the effective spring constant reduction may thus be expressed as:

$$\frac{T}{L}\frac{1}{\cos\alpha*\sin^2\alpha} \geq x\ \%*\text{Intrinsic spring constant}$$

Or for the more general case:

$$\frac{T}{L}\left(\frac{1}{\tan\alpha*\sin\alpha} + \frac{1}{\tan\beta*\sin\beta}\right) \geq x\ \%*\text{Intrinsic spring constant}$$

where x % is 50%, preferably 70%, further preferably 95%, most preferably 99%. In some embodiments, the effective spring constant reduction may be less than a maximum of 500% of the intrinsic spring constant, preferably less than a maximum of 200% or less than a maximum of 150% of the intrinsic spring constant.

The reduction in effective spring constant of the flexure arm 76, can thus be increased by increasing the compressive force $F_w$. $F_w$ can be increased by increasing the tension of the SMA wire 80 (e.g. increasing the degree of wire contraction), or by changing the angle α of the SMA wire 80 with respect to the flexure arm 76 (for a fixed input force Ty by the SMA wire). By orienting the SMA wire 80 at a angle α less than 45 degrees to the flexure arm 76, the input force by the SMA wire 80 is amplified (at the cost of smaller movement), and so $F_w$ may be increased.

Preferably, the flexure arm 76 extends at an acute angle to the SMA wire 80. The acute angle is less than 90°. The acute angle may be less than 45°, or less than 30°, thereby achieving stroke amplification. The acute angle may be in the range from 10° to 30° in order to achieve optimal stroke amplification. The acute angle may be greater than 45° or greater than 600, to achieve force amplification and thus increase the compressive force on the flexure arm. The acute angle may be in the range from 60° to 80° in order to achieve optimal force amplification and flexure stiffness reduction.

Referring back to FIG. 13A, upon ceasing energy supply to the SMA wire 80, e.g. when the SMA actuator assembly 2 is switched off, the SMA wire 80 cools. By the returning force from the flexure arm, $F_w$, reduces and causes the factor $(F_w \cdot d_2)/d_1$ to diminish. This enables the effective spring rate to rise towards the intrinsic spring rate, thereby aiding the movable part to return to a default position.

The invention of applying a compressive force to a flexure arm so as to reduce the effective spring constant of the flexure arm may be applied to any of the amplifying flexures of the embodiments described in relation to FIGS. 2-6, 9 and 12.

The invention of reducing the effective spring constant of a flexure arm extends beyond application to the above-described embodiments. For example, the effective spring constant of flexure arms not intended to achieve stroke or force amplification may be reduced appropriately. In embodiments in which the use of a flexure arrangement may not give rise to stroke amplification, or at least not result in a significant degree of stroke amplification, the reduction in effective spring constant may be achieved nonetheless by placing the flexure arrangement under a compressive force.

Figure 14A:
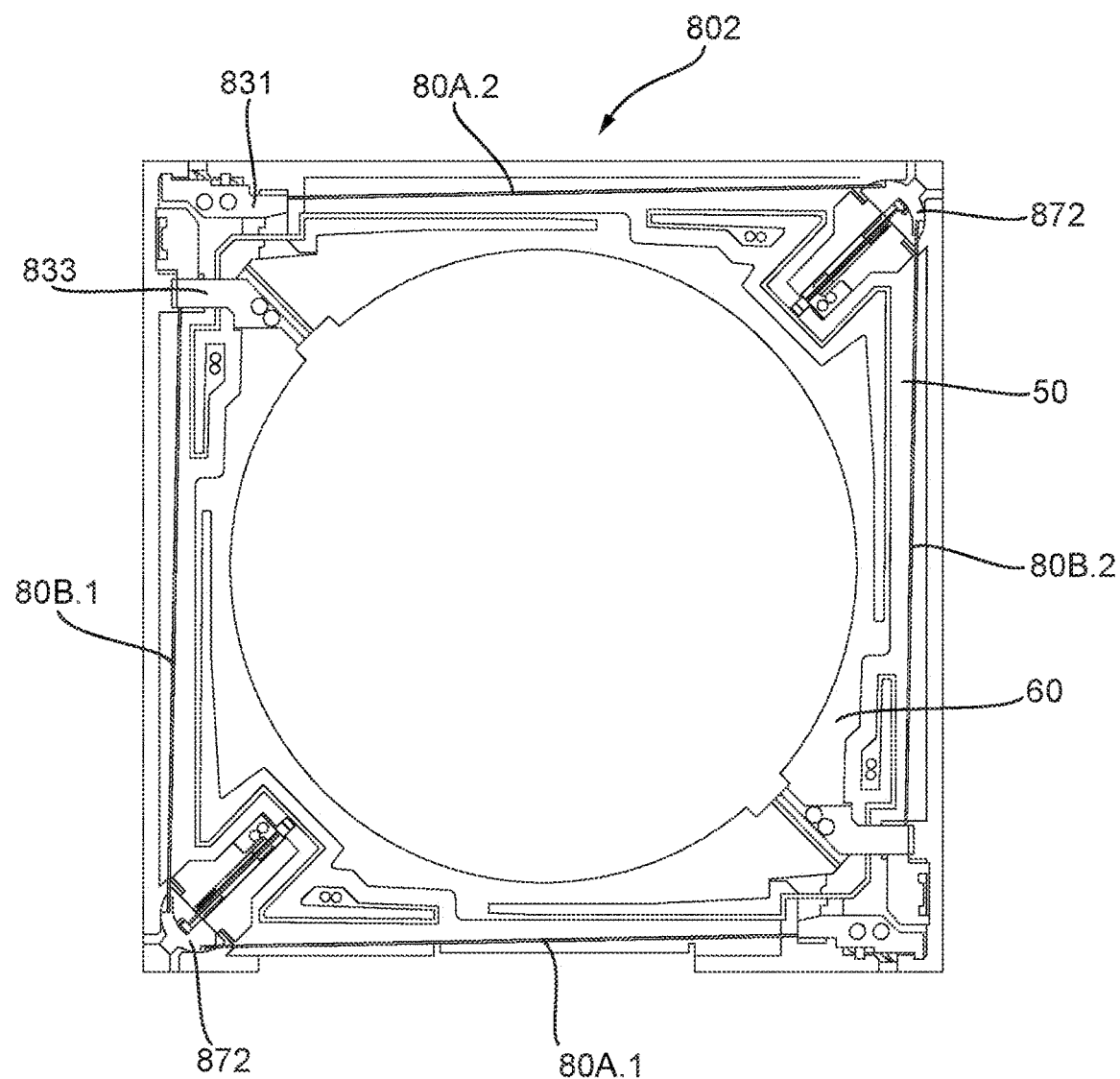
FIGS. 14A-E are plan and perspective views showing a variety of flexure assemblies in which stiffness reduction may be achieved.

FIG. 14A, for example, is a top plan view of plural flexure arrangements 872 of an SMA actuator assembly 802 according to an embodiment of the present invention. Compared to the SMA actuator assemblies described above, which comprises actuator units with a coupling link for transferring the actuating force to the movable part, the SMA actuator assembly 802 of FIG. 14A comprises a flexure arm in which two SMA wire portions are provided, one coupled between the flexure arm and the support structure and another coupled between the flexure arm and the movable part.

Referring in particular to FIG. 14A, the actuator assembly 802 includes a support structure 50 and a movable part 60. Movement of the movable part 60 relative to the support structure 50 is driven by a lateral actuation arrangement comprising two (or more) SMA wires 80 each comprises two lengths, i.e. SMA wires $80_{A,1-2}$, $80_{B,1-2}$.

Each of the SMA wires 80 includes a first length $80_A$ and a second length $80_B$. The first and second lengths are orientated at an angle of about 90° relative to each other. The first and second lengths $80_A$, $80_B$ are coupled to each by a flexure arrangement 872. Each flexure arrangement 872 couples the first and second lengths $80_A$, $80_B$ such that, when the SMA wire 80 is driven, contraction of the first length $80_A$ causes a displacement of the second length $80_B$ that provides a contribution to movement of the movable part 60 that is in addition to the contribution provided by contraction of the second length $80_b$.

Figure 14B:
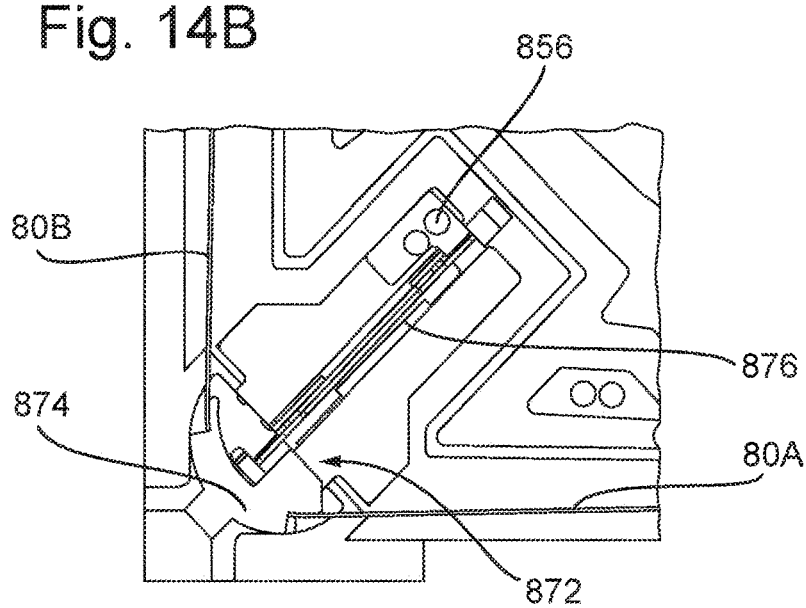

As shown in FIG. 14B, the flexure arrangement 872 has a flexure body 874 that moves relative to the support structure 50 so as to provide a coupling between the first and second lengths of SMA wire $80_A$, $80_B$.

The first length $80_A$ of each of the SMA wires 80 is connected at one of its ends to a static crimp 831, extends at least partway along an outer edge of the moving platform 50, and engages with the flexure body 874 at the other of its ends. The second length $80_B$ of each SMA wire 80 engages with the flexure body 874 at one of its ends, extends at least partway along an adjacent outer edge of the moving platform 60, and is connected at the other of its ends to a moving crimp 833.

In operation, the SMA wires 80 are selectively driven to move the moving part 60 relative to the support platform 50 in any lateral direction (i.e., a direction perpendicular to the optical axis O).

Figure 14C:
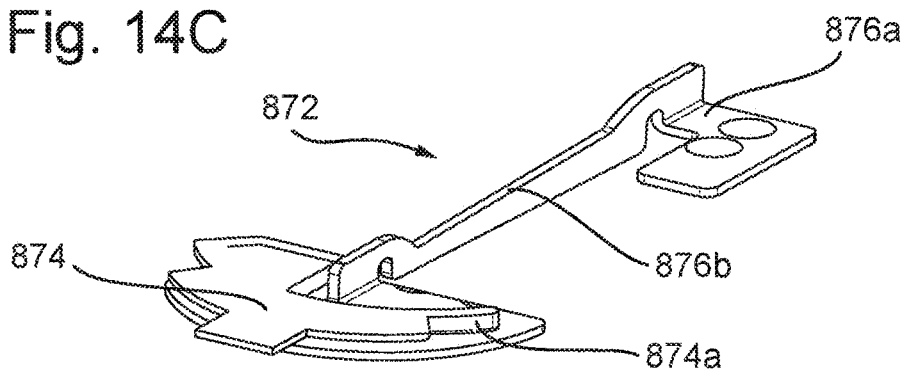

Referring in particular to FIG. 14C, the flexure arrangement 832 will now be described in more detail. It will be appreciated that any of the above-described flexure arrangements may be used in the embodiment of FIG. 14, with the exception that the coupling link is replaced by an SMA wire.

Each flexure arrangement 872 includes a flexure arm 876 connecting the flexure body 874 with the support structure 50 at a connection point 856. The flexure body 874 an upper plate, a curved inner wall 874a and a lower plate, with the SMA wire 80 hooked over the curved inner wall 874a and between the upper plate and the lower plate to prevent inwards lateral or upwards or downwards movement. The curved inner wall 874a has a radius that is at least the minimum bend radius of the SMA wire 80 to ensure a safe feature for the SMA wire 80 to contact. In the illustrated embodiment, SMA wire 80 is fixed attached to the flexure body 874 with suitable means, e.g. by welding or by adhesive. In some other embodiments, the SMA wire 80 may be attached to the flexure body 874 by friction, e.g. the tension of SMA wire 80 pushes the SMA wire 80 against the flexure body 874 and holds it in place.

The flexure arm 876 extends radially, or laterally inwards, from the flexure body 874, in the same manner to flexure arrangement 772 of FIG. 2B or FIG. 3. More specifically, the flexure arm 876 comprises a planar portion 876a extending in the X-Y plane for forming a conforming surface with the support structure 50 at connection point 756. The flexure arm 876 further comprises a flexure element 876b that is compliant in the X-Y direction but not in the Z direction. The flexure element 876b extends perpendicularly to the planar portion 876a such that the flexure element 876b is much wider along the optical axis than it is in the X-Y plane. A thicker flexure element 876b may provide a larger biasing force in the X-Y plane but increases the resistance to bending. The flexure arrangement may be formed from any suitable method, such as etching, moulding and pressing from a sheet metal.

Figure 14D:
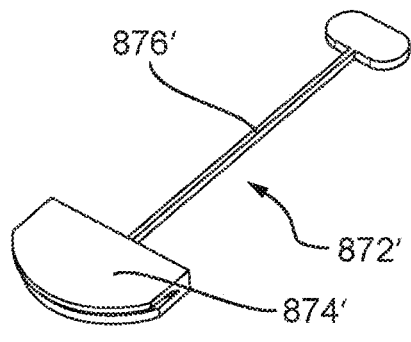
Figure 14E:
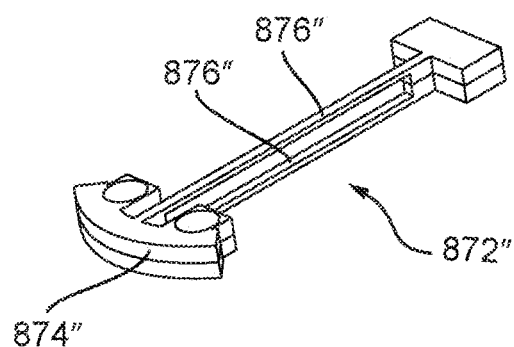

Other flexure designs, such as those 872', 872" shown in FIGS. 14D and 14E, may be used in the actuator 802 in lieu of flexure arrangement 872. Both of the designs 872', 872" comprise a groove for supporting and restraining the SMA wire 80 at their respective flexure bodies 874. FIG. 11D shows a simple design where the flexure arm 872' and flexure body 874' are integrally formed and comprises a single flexing beam, whereby FIG. 11E shows a more robust design with two flexure beams formed by an etching process. Relative stiffnesses between the examples will differ as this depends on flexure material and geometry, but if the resultant wire force places the beam in compression then they will all achieve reduction in effective stiffness.

The flexure arm 876 in this embodiment is oriented at an acute angle α of about 45° relative to the SMA wire 80. A compressive force may be applied to the flexure arm 876 in order to achieve a reduction in effective spring rate in the flexure arm upon actuation of SMA wires 80. However, because of the orientation of the flexure arm 876 as shown in FIG. 11B, this particular embodiment may not achieve any degree of stroke amplification due to the flexure arm. That is, the achievable stroke in SMA actuator 802 may depend entirely on the amount of contraction in the SMA wire 80.

The flexure arm 876 is compliant in the x-y plane such that as the SMA wire 80 contracts the flexure body 874 translate relative to and/or rotate about the optical axis O. When doing so, the flexure arm 876 is put in compression and therefore, in a manner similar to that illustrated in FIG. 13A, the effective spring rate is reduced to a fraction of that without actuating the SMA wire 80.

Figure 15A:
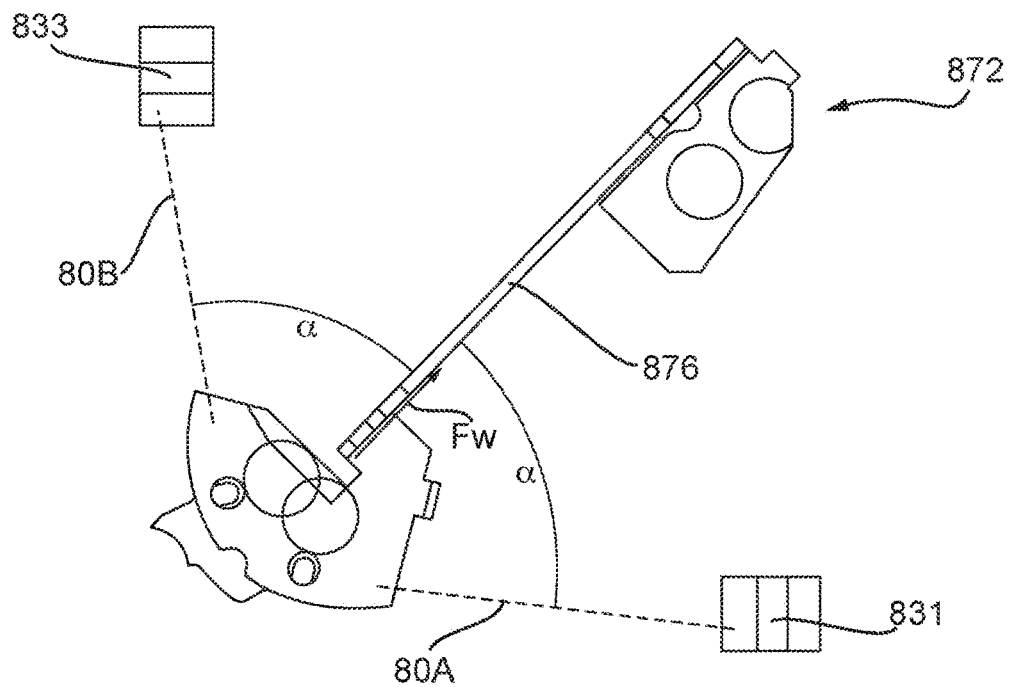
FIGS. 15A-D are schematic plan views illustrating the relative positioning of SMA wire and flexure arms.
Figure 15B:
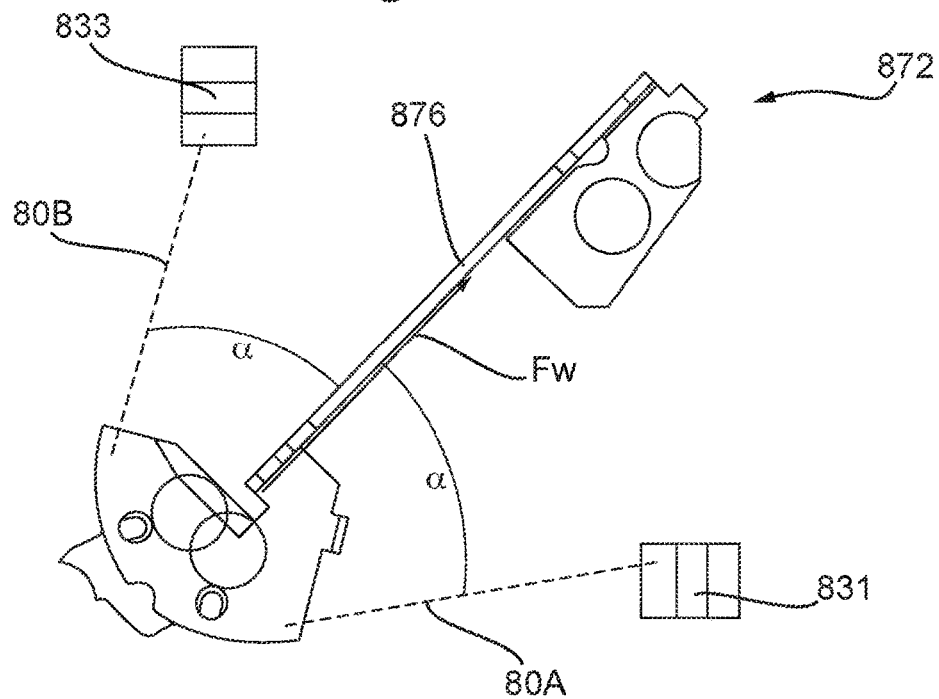

In the flexure arrangement 872 as shown in FIG. 14A, where the two lengths of SMA wire 80 are connected to the flexure body 874 and additively contribute to the movement of the moveable part 60, the angle α refers to the angle between the flexure arm 876 and the length SMA wire $80_A$ that is connected with the static crimp 831, i.e. where the moveable part 60 is being drawn towards. In the case where the SMA wires $80_A$, $80_B$ is arranged at equal distance from the flexure arm, the angles α between the flexure arm and the SMA wires $80_A$, $80_B$ on either side of the flexure arm would be equal, as shown in the examples in FIGS. 15A and 15B. More specifically, a shallower angle α as shown in FIG. 15A would result in a weaker wire resultant force $F_w$ for compressing the flexure arm 876, thus a lower degree of flexure stiffness reduction, when compared to a flexure arrangement having a shaper angle α as shown in FIG. 15B.

Figure 15C:
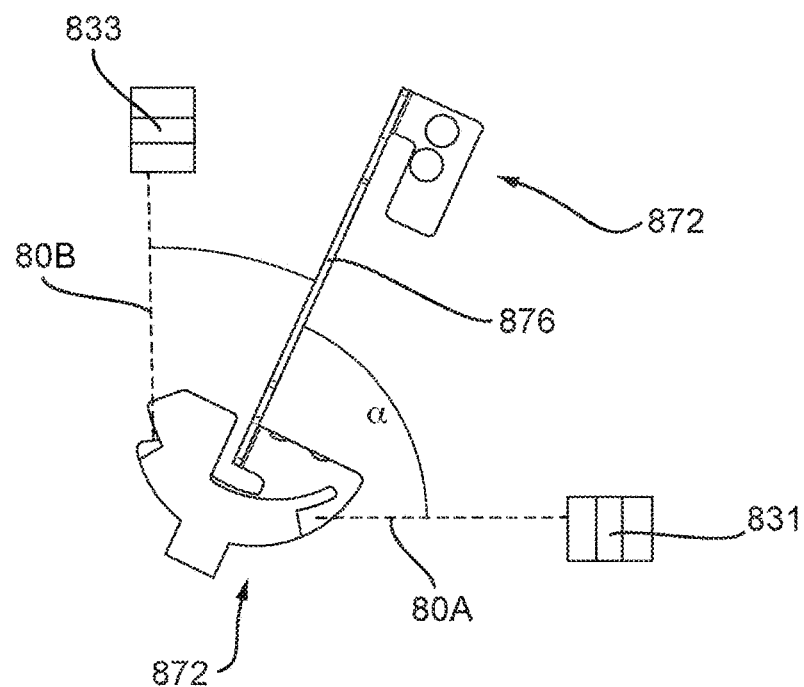
Figure 15D:
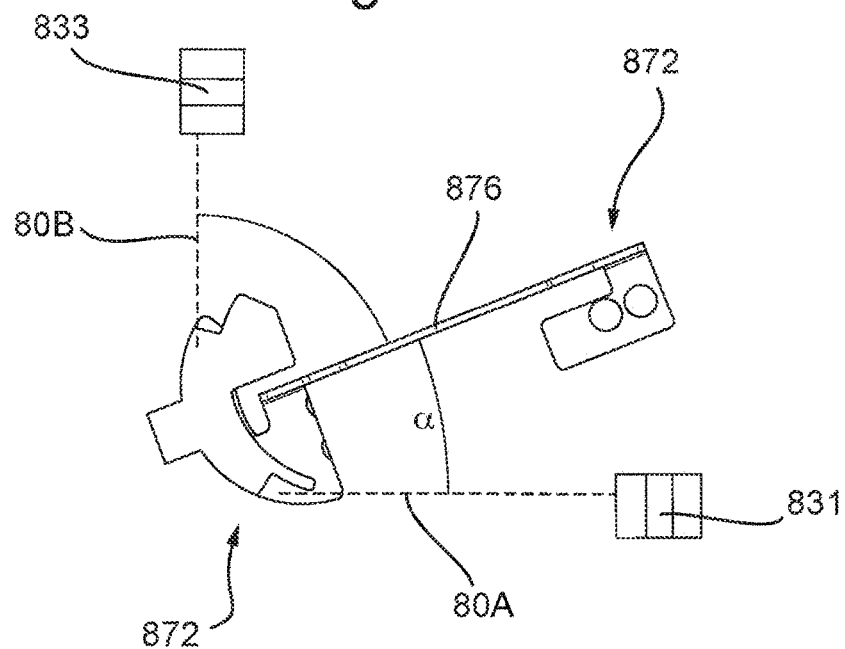

In some other cases, such as the examples as shown in FIGS. 15C and 15D, the orientation of the flexure arm may be arranged such that the SMA wires 80A, 80B extend perpendicularly to each other. In FIG. 15C, the flexure arrangement 872 is attached at a connection point proximal to the moving crimp 833, thus resulting a shallower angle between the flexure arm 876 and the SMA wire $80_A$ than that of flexure arrangement 872 positioned proximal to the static crimp 831 as shown in FIG. 15D. As a result, a shallower angle α as shown in FIG. 15C would result in a larger wire resultant force $F_w$ for compressing the flexure arm 876 (given a fixed tension in the SMA wire between flexure arm and fixed crimp 831), thus a higher degree of flexure stiffness reduction. This is at the cost of reduced stroke amplification when compared to a flexure arrangement having a more acute angle α as shown in FIG. 15D.

Figure 16:
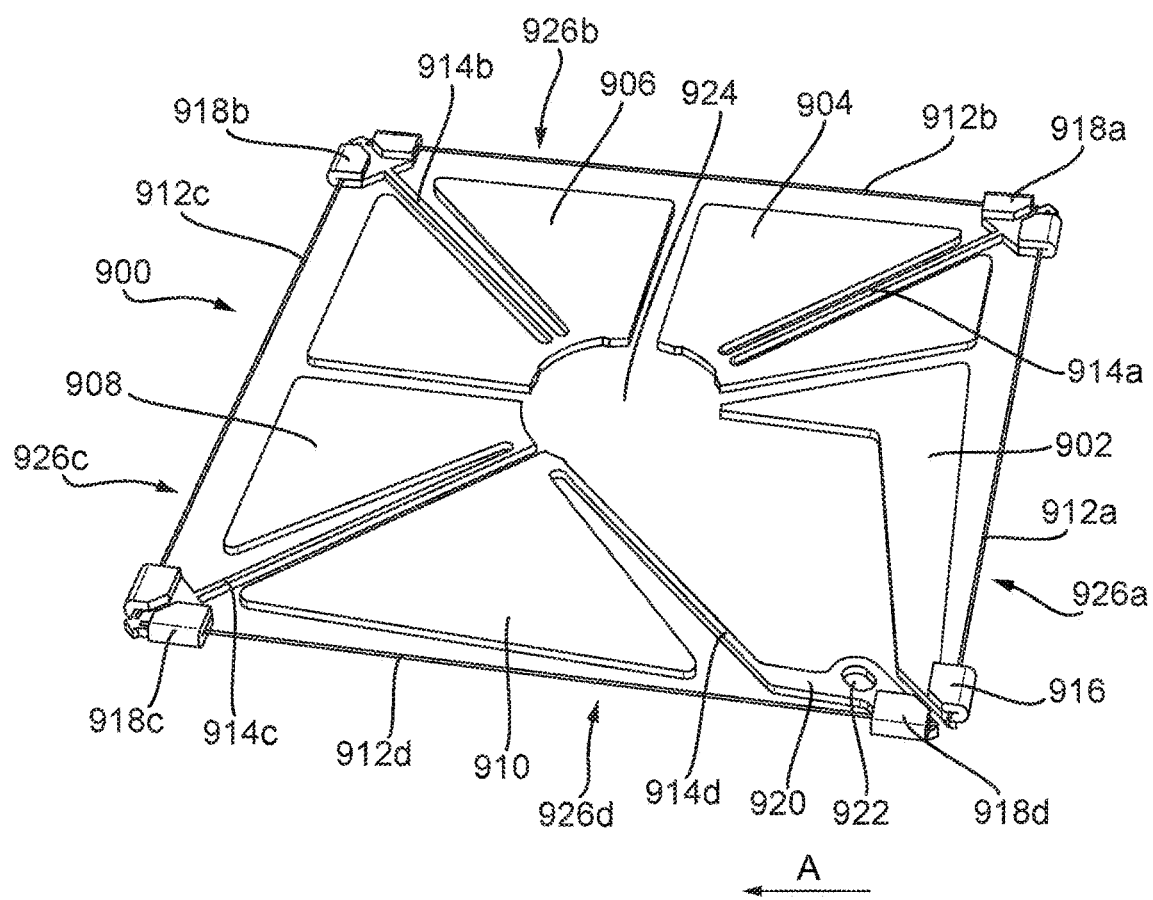
FIG. 16 is a schematic perspective view of another SMA actuator assembly in which stiffness reduction may be achieved.

FIG. 16 shows a perspective view of a support structure of an actuator 900 according to another embodiment of the present invention. More details of the actuator 902 can be found in WO2018/206748A, which is incorporated herein in its entirety. The support structure 900 may comprise five base portions 902, 904, 906, 908, and 910 which are substantially flat and are arranged in a plane as shown. The base portions 902-910 may be fixedly coupled to a substrate. An aperture 924 is formed by the inner boundary of the base portions 902-910. The base portions 902-910 may be arranged to form a quadrilateral shape as shown.

Base portion 902 may comprise a crimp 916. The base portion 902 may be arranged such that crimp 916 may be provided at a corner of the support structure 900. Base portion 902 and crimp 916 may be fixedly coupled to the substrate and unable to move. Crimp 916 may be used to grip an end of an SMA wire or a segment of SMA wire 912a which runs along side/edge 926a of the support structure 900.

Base portions 904-910 each comprises a flexure arrangement 914a-d at each corner of the base portion for coupling or guiding the SMA wire portions 912a-d. The flexure arrangements 914a-d comprise flexure arms attach to the respective base portions 904-910 and flexure bodies 918a-d where crimps are provided. Thus, the flexure arrangements 914a-d are configured to couple together separate pieces of SMA actuator wire 912a-d.

Upon actuation, SMA wire 912a contracts and causes movement/displacement of flexure body 918a, which is able to move because of flexure arm of flexure arrangement 914a. The movement of flexure body 918a also causes movement/displacement of flexure body 918b, which is able to move because of flexure arrangement 914b. Thus, movement of flexure body 918b occurs before current is passed along SMA wire 912b. When current is passed along SMA wire 912b, the SMA wire 912b contracts and the contraction causes further movement/displacement of flexure body 918b. Thus, the amount by which SMA wires 912a and 912b contract may add up to the amount by which flexure body 918b is displaced.

Likewise, the amount by which SMA wires 912a-d contract may add up to the amount by which flexure body 918d is displaced. More specifically, upon actuation, each SMA wire 912a-d contracts and cause the respective flexure arm in arrangement 914a-d to flex/bend. Each flexure arm in arrangement 914a-d may move further than the previous flexure arrangement as the SMA wire contractions add together. The movement of the final flexure body 918d causes movement of the slot 122 in direction A, which moves a moveable part it engages with. This movement is hence the sum of all the SMA contractions.

Similar to the flexure arrangement 802 of FIG. 14A, the flexure arms 914a-d in this embodiment are oriented at an acute angle α of about 45° relative to their respective SMA wires 912a-d which, upon actuation of SMA wires 912a-d, exert a compression force which results in a reduction in effective spring rate in the flexure arm. However, because of the orientation of the flexure arm, this embodiment may not achieve any stroke amplification. That is, the achievable stroke in SMA actuator 900 may depend entirely on the total amount of contraction in the SMA wires 912a-d.

In some other embodiments (not shown), the reduction in effective spring rate in flexure arms may be achieved even when the actuator, e.g. SMA actuator, voice coil motors (VCM), MEMs devices and piezoelectric devices, are not directly attached onto the flexure arms. That is, the compressive force may be exerted, through another component such as a rigid member, or another flexure arrangement, or by the moveable part, onto the flexure arm to achieve such reduction in effective spring rate.

In some other embodiments (not shown), a dedicated actuator may be provided for exerting a compressive force on the flexure arm in order to reduce its effective spring rate.

The present invention may be further described by the following clauses.

A1. A shape memory alloy (SMA) actuator assembly comprising:
- a support structure;
- a movable part movable relative to the support structure;
- at least one flexure arrangement comprising a flexure body and plural flexure components connected to the flexure body, wherein the flexure arrangement is connected to each of the support structure and the movable part by one of the flexure components;
- an SMA component attached to the flexure body or the flexure components, and one of the support structure and the movable part, the SMA component is configured to, on contraction, cause at least one of the flexure components to deform and thereby moves the movable part substantially along a movement plane;
- wherein the displacement of the movable part is greater than the amount of contraction in the SMA component, along the movement plane.

A2. An SMA actuator assembly according to clause A1, wherein the flexure components comprises a second flexure arm connecting one of the support structure and the movable part at a second connection point, wherein second flexure arm is configured to deform on contraction of the SMA component.

A3. An SMA actuator assembly according to clause A1 or clause A2, wherein the flexure components comprises a pivot connecting, at a first connection point, to one of the support structure and the movable part that is attached to the SMA component, wherein the flexure body is configured to rotate about the first connection point in the movement plane, and wherein the said rotation of the flexure body amplifies the displacement of the movable part.

A4. An SMA actuator assembly according to clause A1 or clause A2, wherein the flexure components comprises a first flexure arm (or amplifying flexure) connecting, at a first connection point, to one of the support structure and the movable part that is attached to the SMA component, the said one of the support structure and the movable part being attached to the SMA component, wherein by deforming the first flexure arm, the flexure body is configured to rotate about and/or translate relative to the first connection point in the movement plane, and wherein the said rotation and/or the translation of the flexure body amplifies the displacement of the movable part.

A5. An SMA actuator assembly according to clause A4, wherein the first flexure arm is configured to have the same or different stiffness in a direction along the movement plane.

A6. An SMA actuator assembly according to clause A5 when depending on clause A2, wherein the second flexure arm is, along its length, configured to have a higher stiffness than, or a lower stiffness than, or substantially the same stiffness as that of the first flexure arm.

A7. An SMA actuator assembly according to any one of the clauses A2 to A6, wherein the second flexure arm extends along a side surface of the movable part.

A8. An SMA actuator assembly according to any one of the preceding clauses, wherein at least one of the flexure components are configured to have a lower stiffness in a direction along the movement plane than any other directions to facilitate the rotation and/or translation of the flexure body.

A9. An SMA actuator assembly according to any one of the clauses A3 to A8 when not depending on clauses A1 and A2, wherein during the rotation and/or translation of the flexure body, the orientation of the flexure body relative to the first connection point changes within a range of any one of less than 20 degrees, less than 10 degrees, less than 8 degrees, or less than 5 degrees.

A10. An SMA actuator assembly according to any one of the clauses A4 to A9 when not depending on clauses A1 to A3, wherein the orientation of the first flexure arm with respect to the flexure body corresponds to a degree of amplification in displacement of the movable part.

A11. An SMA actuator assembly according to any one of the clauses A10, wherein the first flexure arm extends from the flexure body at an acute angle to the SMA component, wherein the acute angle is less than 45° and/or greater than 20°.

A12. An SMA actuator assembly according to any one of the clauses A4 to A11, wherein one of the plural flexure components is configured to deform generally in tension and/or the other one of the plural flexure components is configured to deform generally in compression.

A13. An SMA actuator assembly according to any one of the clauses A4 to A12, wherein the length of SMA component extends at a first offset from the first connection point and the second flexure arm extends at a second offset from the first connection point, wherein the ratio of second offset to the first offset corresponds to a degree of amplification in displacement of the movable part, the ratio of second offset to the first offset is at least greater than 1, or at least 1.2, or at least 1.5, or at least 2.

A14. An SMA actuator assembly according to any one of the preceding clauses, wherein the flexure body is integrally formed with the flexure components.

A15. An SMA actuator assembly according to any one of the preceding clauses, wherein the flexure body has a higher rigidity than at least one of the flexure components such that the flexure body resists deformation as the SMA component contracts.

A16. An SMA actuator assembly according to any one of the preceding clauses, wherein the flexure arrangement is configured to provide an electrically conductive path between the SMA component and a conductive circuitry of the support structure.

A17. An SMA actuator assembly according to clause A16, wherein the flexure arrangement comprises an electrical break for directing the electrically conductive path.

A18. An SMA actuator assembly according to any one of the preceding clauses, comprising two flexure arrangements provided on two diagonally opposing corners of the support structure.

A19. An SMA actuator assembly according to any one of the preceding clauses, comprising two pairs of flexure arrangements provided on two diagonally opposing corners of the support structure.

A20. An SMA actuator assembly according to clause 19, wherein each pair of flexure arrangement is stacked at a respective and opposing corner of the support structure when view in a direction orthogonal to the movement plane.

A21. An SMA actuator assembly according to any one of clauses A18 to A20, wherein each of the flexure arrangements having at least one flexure component connected to a respective side of the movable part.

A22. An SMA actuator assembly according to any one of the clauses A18 to A21, wherein each of the flexure arrangements are attached to the support structure or the movable part by a respective SMA component, wherein each SMA component is configured to, on contraction, cause the respective flexure arm to deform and thereby moves the movable part in a respective direction along a movement plane.

A23. An SMA actuator assembly according to any one of the preceding clauses, the SMA actuator assembly comprising plural flexure arrangements, wherein the movable part is formed from plural parts each formed integrally with a respective flexure arrangement.

A24. A camera assembly comprising the SMA actuator assembly according to any one of the preceding claims, wherein the movable part comprises a lens having an optical axis perpendicular to the movement plane, wherein the SMA actuator assembly provides optical image stabilisation (OIS) for the camera assembly.

The invention claimed is:

1. An actuator assembly comprising:
   first and second parts that are movable relative to each other; and
   one or more actuating units, each actuating unit comprising:
      a force-modifying mechanism connected to the first part;
      a coupling link connected between the force-modifying mechanism and the second part; and
      an SMA wire connected between the first part and the force-modifying mechanism for applying an input force on the force-modifying mechanism thereby causing the force-modifying mechanism to apply an output force on the coupling link and causing the coupling link to apply an actuating force on the second part;
   wherein the coupling link is compliant in a direction perpendicular to the direction of the actuating force;
      wherein the force-modifying mechanism is configured such that, in response to a change in length of the SMA wire, the end of the SMA wire that is connected to the force-modifying mechanism moves relative to the first part by a first distance, and the end of the coupling link that is connected to the force-modifying mechanism moves relative to the first part by a second distance that is different to the first distance.

2. The actuator assembly according to claim 1, wherein the second distance is greater than the first distance, preferably wherein the ratio of second distance to first distance is greater than 2.

3. The actuator assembly according to claim 1, wherein the second distance is less than the first distance, preferably wherein the ratio of second distance to first distance is less than 0.5.

4. An actuator assembly comprising:
   first and second parts that are movable relative to each other; and
   one or more actuating units, each actuating unit comprising:
      a force-modifying mechanism connected to the first part;
      a coupling link connected between the force-modifying mechanism and the second part; and
      an SMA wire connected between the first part and the force-modifying mechanism for applying an input force on the force-modifying mechanism thereby causing the force-modifying mechanism to apply an output force on the coupling link and causing the coupling link to apply an actuating force on the second part;
   wherein the coupling link is compliant in a direction perpendicular to the direction of the actuating force;
      wherein the force-modifying mechanism applies the input force on the coupling link so as to put the coupling link under tension, thereby applying the actuating force to the second part, wherein the coupling link comprises a flexure, wherein the flexure is elongate and is stiff along its length and compliant in a direction perpendicular to its length.

5. An actuator assembly comprising:
   first and second parts that are movable relative to each other; and
   one or more actuating units, each actuating unit comprising:
      a force-modifying mechanism connected to the first part;
      a coupling link connected between the force-modifying mechanism and the second part; and
      an SMA wire connected between the first part and the force-modifying mechanism for applying an input force on the force-modifying mechanism thereby causing the force-modifying mechanism to apply an output force on the coupling link and causing the coupling link to apply an actuating force on the second part;
   wherein the coupling link is compliant in a direction perpendicular to the direction of the actuating force;
      wherein the SMA wire extends in a first direction from the force-modifying mechanism to the first part and the coupling link extends in a second direction from the force-modifying mechanism to the second part, the first and second directions being substantially perpendicular to each other.

6. An actuator assembly comprising:
   first and second parts that are movable relative to each other; and
   one or more actuating units, each actuating unit comprising:
      a force-modifying mechanism connected to the first part;
      a coupling link connected between the force-modifying mechanism and the second part; and
      an SMA wire connected between the first part and the force-modifying mechanism for applying an input force on the force-modifying mechanism thereby causing the force-modifying mechanism to apply an output force on the coupling link and causing the coupling link to apply an actuating force on the second part;

wherein the coupling link is compliant in a direction perpendicular to the direction of the actuating force;
  wherein the force-modifying mechanism applies the input force on the coupling link so as to put the coupling link under compression, thereby applying the actuating force to the second part, wherein the coupling link comprises a rolling bearing or a plain bearing.

7. An actuator assembly comprising:
  first and second parts that are movable relative to each other; and
  one or more actuating units, each actuating unit comprising:
    a force-modifying mechanism connected to the first part;
    a coupling link connected between the force-modifying mechanism and the second part; and
    an SMA wire connected between the first part and the force-modifying mechanism for applying an input force on the force-modifying mechanism thereby causing the force-modifying mechanism to apply an output force on the coupling link and causing the coupling link to apply an actuating force on the second part;
  wherein the coupling link is compliant in a direction perpendicular to the direction of the actuating force;
  wherein the force-modifying mechanism comprises:
  a movable portion to which the SMA wire and the coupling link are connected; and
  a force-modifying flexure connected between the movable portion and the first part and configured to bend in response to the input force.

8. The actuator assembly according to claim 7, wherein the SMA wire extends in a first direction from the movable portion to the first part and the force-modifying flexure extends in a third direction from the movable portion to the first part, the angle between the first and third directions being less than 45° and/or greater than 20°.

9. The actuator assembly according to claim 7, wherein the movable portion is generally in compression in operation; and
  wherein the force-modifying flexure, in operation, is generally in tension and is configured to bend.

10. The actuator assembly according claim 7, wherein the moveable portion is integrally formed with the force-modifying flexure and/or the coupling link.

11. An actuator assembly comprising:
  first and second parts that are movable relative to each other; and
  one or more actuating units, each actuating unit comprising:
    a force-modifying mechanism connected to the first part;
    a coupling link connected between the force-modifying mechanism and the second part; and
    an SMA wire connected between the first part and the force-modifying mechanism for applying an input force on the force-modifying mechanism thereby causing the force-modifying mechanism to apply an output force on the coupling link and causing the coupling link to apply an actuating force on the second part;
  wherein the coupling link is compliant in a direction perpendicular to the direction of the actuating force;
  wherein the force-modifying mechanism comprises a lever, optionally wherein the movable portion acts as a lever.

12. An actuator assembly comprising:
  first and second parts that are movable relative to each other; and
  one or more actuating units, each actuating unit comprising:
    a force-modifying mechanism connected to the first part;
    a coupling link connected between the force-modifying mechanism and the second part; and
    an SMA wire connected between the first part and the force-modifying mechanism for applying an input force on the force-modifying mechanism thereby causing the force-modifying mechanism to apply an output force on the coupling link and causing the coupling link to apply an actuating force on the second part;
  wherein the coupling link is compliant in a direction perpendicular to the direction of the actuating force;
    the actuator assembly comprising two actuating units arranged to apply actuating forces on the second part in perpendicular directions such that the coupling link of each of the two actuating units is compliant in the direction of the actuating force of the other of the two actuating units.

13. An actuator assembly comprising:
  first and second parts that are movable relative to each other; and
  one or more actuating units, each actuating unit comprising:
    a force-modifying mechanism connected to the first part;
    a coupling link connected between the force-modifying mechanism and the second part; and
    an SMA wire connected between the first part and the force-modifying mechanism for applying an input force on the force-modifying mechanism thereby causing the force-modifying mechanism to apply an output force on the coupling link and causing the coupling link to apply an actuating force on the second part;
  wherein the coupling link is compliant in a direction perpendicular to the direction of the actuating force;
    the actuator assembly comprising four actuating units arranged so as to be capable of moving the second part relative to the first part in any direction in a movement plane without applying any net torque to the second part about a primary axis perpendicular to the movement plane.

14. The actuator assembly according to claim 13, wherein a first pair of actuating units are each configured to apply a torque to the second part in one sense about the primary axis, and a second pair of actuating units are each configured to apply a torque to the second part in the other sense about the primary axis.

15. The actuator assembly according to claim 13, wherein the four actuating units are arranged such that their flexures are arranged in a loop at different angular positions around the primary axis and such that the angular position of the coupling link of each actuating unit at least partly overlaps with the angular position of the SMA wire of one other actuating unit.

16. An actuator assembly comprising:
  first and second parts that are movable relative to each other;
  a flexure arm comprising a fixed end and a movable end, wherein the fixed end is coupled to the first part and the movable end is coupled to the second part; and an actuator component arranged, on contraction, to cause the flexure arm to deform and thereby drive movement of movable end so as to move the second part relative to the first part;

wherein the actuator component is arranged to exert a compressive force on the flexure arm, the compressive force having a magnitude that causes an effective spring constant of the flexure arm, in a direction along the force applied by the actuator component on the flexure arm, to be reduced by 50% or more compared to a situation in which there is no compressive force exerted on the flexure arm.

17. The actuator assembly of claim 16, wherein the magnitude of the compressive force causes the effective spring constant of the flexure arm to be reduced by at least 90%, compared to a situation in which there is no compressive force exerted on the flexure arm.

* * * * *